(12) United States Patent
Molinek et al.

(10) Patent No.: US 12,131,545 B2
(45) Date of Patent: Oct. 29, 2024

(54) WORKSPACE OPERATING CONDITION DETECTION APPARATUS FOR USE WITH A FALL PROTECTION DEVICE AND METHODS OF USING THE SAME

(71) Applicant: Honeywell International Inc., Charlotte, NC (US)

(72) Inventors: Miroslav Molinek, Havirov (CZ); Jan Riha, Brno (CZ); Jan Hrouzek, Damborice (CZ); Radim Drmela, Holubice (CZ); Tanguy Prevot, Nebovidy (CZ); Marc Dudelzak, Bracknell (GB)

(73) Assignee: Honeywell International Inc., Charlotte, NC (US)

( * ) Notice: Subject to any disclaimer, the term of this patent is extended or adjusted under 35 U.S.C. 154(b) by 298 days.

(21) Appl. No.: 17/658,058

(22) Filed: Apr. 5, 2022

(65) Prior Publication Data
US 2023/0316758 A1    Oct. 5, 2023

(51) Int. Cl.
*G06V 20/52* (2022.01)
*A62B 35/00* (2006.01)
(Continued)

(52) U.S. Cl.
CPC .......... *G06V 20/52* (2022.01); *A62B 35/0068* (2013.01); *G06T 7/70* (2017.01);
(Continued)

(58) Field of Classification Search
CPC ........ G06V 20/52; G06V 20/56; G06V 10/70; G06V 40/10; G06T 7/70;
(Continued)

(56) References Cited

U.S. PATENT DOCUMENTS 11,298,572 B2 *  4/2022  Dillon ................ A62B 35/0075
2019/0137991 A1   5/2019  Agarwal
(Continued)

FOREIGN PATENT DOCUMENTS

KR    20220015771 A  *  2/2022   ............. G08B 21/18
WO    2012/109444 A2    8/2012
(Continued)

OTHER PUBLICATIONS

European search report Mailed on Aug. 3, 2023 for EP Application No. 23165355, 10 page(s).

*Primary Examiner* — Ricky Chin
(74) *Attorney, Agent, or Firm* — Alston & Bird LLP

(57) ABSTRACT

Various embodiments are directed to apparatuses and methods for detecting a workspace operating condition associated with a workspace. In various embodiments, an apparatus for detecting a workspace operating condition associated with a workspace may comprise an imaging device configured to capture imaging data, the imaging data comprising an image of a first connection location corresponding to a workspace anchor and a second connection location corresponding to an operator attachment; and a controller configured to detect a workspace operating condition associated with the workspace based on the imaging data; wherein the workspace operating condition is defined by a first connection status of a fall protection device at the first connection location and a second connection status of the fall protection device at the second connection location, wherein the controller configured to detect the first connection status and the second connection status based at least in part on the imaging data.

17 Claims, 6 Drawing Sheets

(51) Int. Cl.
*G06T 7/70* (2017.01)
*G06V 10/70* (2022.01)
*G06V 20/56* (2022.01)
*G06V 40/10* (2022.01)
*G08B 21/04* (2006.01)

(52) U.S. Cl.
CPC .............. *G06V 10/70* (2022.01); *G06V 20/56* (2022.01); *G06V 40/10* (2022.01); *G08B 21/043* (2013.01); *G08B 21/0476* (2013.01); *G06T 2207/20081* (2013.01); *G06T 2207/30196* (2013.01); *G06T 2207/30232* (2013.01)

(58) Field of Classification Search
CPC . G06T 2207/20081; G06T 2207/30196; G06T 2207/30232; A62B 35/0068; G08B 21/0476; G08B 21/043
See application file for complete search history.

(56) References Cited

U.S. PATENT DOCUMENTS

| | | | | |
|---|---|---|---|---|
| 2019/0374798 | A1* | 12/2019 | Thompson | A62B 35/0093 |
| 2021/0276189 | A1* | 9/2021 | Silverstein | B25J 11/00 |
| 2022/0088425 | A1* | 3/2022 | Miller | A62B 35/04 |
| 2023/0218934 | A1* | 7/2023 | Carlson | B66F 11/04 |
| | | | | 182/3 |
| 2023/0364452 | A1* | 11/2023 | Thayer | A62B 35/0037 |
| 2024/0024712 | A1* | 1/2024 | Prevot | A62B 35/0093 |

FOREIGN PATENT DOCUMENTS

| | | | |
|---|---|---|---|
| WO | 2020/194121 A1 | 10/2020 | |
| WO | WO-2020218453 A1 * | 10/2020 | ............... E02F 3/32 |

* cited by examiner

WORKSPACE OPERATING CONDITION DETECTION APPARATUS FOR USE WITH A FALL PROTECTION DEVICE AND METHODS OF USING THE SAME

FIELD OF THE INVENTION

Various embodiments described herein relate generally to safety equipment or personal protective equipment (PPE), including fall protection devices used by operators within a materials handling environment during operation of various materials handling vehicles capable of operating at an elevated height.

BACKGROUND

Generally, in material handling environments like, but not limited to, high volume distribution and fulfillment operations, materials handling vehicles can be used to retrieve objects from various storage locations defined at elevated heights. Fall protection equipment may be utilized by an operator of a materials handling vehicle to minimize risk of falling from the elevated height during operation of a materials handling vehicles. Applicant has identified several technical challenges associated with operation of various materials handling vehicles with fall protection devices and other associated systems and methods. Through applied effort, ingenuity, and innovation, many of these identified challenges have been overcome by developing solutions that are included in embodiments of the present invention, many examples of which are described in detail herein.

BRIEF SUMMARY

Various embodiments are directed to apparatuses and methods for detecting a workspace operating condition associated with a workspace. In various embodiments, an apparatus for detecting a workspace operating condition associated with a workspace may comprise an imaging device configured to capture imaging data associated with a workspace, the imaging data comprising at least one image of a first connection location corresponding to a workspace anchor and a second connection location corresponding to an operator attachment; and a controller configured to detect a workspace operating condition associated with the workspace based at least in part on the imaging data captured by the imaging device; wherein the workspace operating condition is defined at least in part by a first connection status of a fall protection device at the first connection location and a second connection status of the fall protection device at the second connection location, wherein the controller configured to detect the first connection status and the second connection status based at least in part on the imaging data.

In various embodiments, the workspace may be defined by a materials handling vehicle, wherein the imaging device is secured to the materials handling vehicle and configured relative to the workspace such that the first connection location and the second connection location are within a field of view of the imaging device. In various embodiments, the workspace operating condition comprises a safe operating condition, and wherein the controller is configured to detect the safe operating condition based at least in part on the first connection status being defined by a first connection condition between the fall protection device and the workspace anchor and the second connection status being defined by a second connection condition between the fall protection device and the operator attachment. In certain embodiments, the imaging data comprises at least one image of a operator position location corresponding to an operating position defined within the workspace; wherein the controller is further configured to detect an operator position status at the operator position location based at least in part on the imaging data; and wherein the controller is configured to detect the safe operating condition based further on the operator position status being defined by an occupied workspace condition.

In various embodiments, the controller may be configured to detect the first connection condition based on one or more of a determined proximity of a first end of the fall protection device to the workspace anchor, the determined interconnection orientation between the first end of the fall protection device and the workspace anchor, and a detected presence of the first end of the fall protection device at the first connection location. In various embodiments, the controller may be further configured to monitor the workspace operating condition associated with the workspace by at least substantially continuously capturing the imaging data.

In various embodiments, the imaging data may further comprise at least one image of an operator position location corresponding to an operating position defined within the workspace, and wherein the controller is further configured to detect an operator position status at the operator position location based at least in part on the imaging data. In certain embodiments, the workspace operating condition may comprise a blind spot operating condition, and wherein the controller may be configured to detect the blind spot operating condition based at least in part on the first connection status being defined by a first connection condition between the fall protection device and the workspace anchor and one or more of the operator position status being defined by an out-of-position operator condition and the second connection status being defined by an absent condition wherein the operator attachment is not present within a field of view of the imaging device. In certain embodiments, the workspace operating condition may comprise a danger operating condition, and wherein the controller may be configured to detect the danger operating condition based at least in part on the operator position status being defined by an occupied workspace condition, and one or more of the first connection status and the second connection status being defined by a detached condition of the fall protection device. In certain embodiments, the controller may be further configured to detect a drive signal corresponding to an operator interaction with one or more controls of a materials handling vehicle comprising the workspace, and wherein the controller is configured to detect the danger operating condition based further on a detection of the drive signal at an instance when the one or more of the first connection status and the second connection status is defined by the detached condition.

In various embodiments, the apparatus may further comprise an operating condition indicator in electronic communication with the controller such that the operating condition indicator is configured to receive one or more indicator signals corresponding to the detected workspace operating condition from the controller and, in response, transmit an alert signal corresponding to the detected workspace operating condition based on the one or more indicator signals, the alert signal embodying an indicator of the detected workspace operating condition. In certain embodiments, the operating condition indicator may be configured to transmit a first alert signal corresponding to a first detected workspace operating condition based on a first indicator signal received from the controller and a second alert signal corresponding to a second detected workspace operating condition based on a second indicator signal received from the controller, wherein the first alert signal and the second alert signal are at least substantially different from one another.

In various embodiments, the controller may be configured to process the imaging data captured by the imaging device by executing one or more machine learning operations to programmatically detect a first connection condition between the fall protection device and the workspace anchor at the first location and a second connection condition between the fall protection device and the operator attachment at the second connection location, wherein the first connection status is defined by the first connection condition and the second connection status is defined by the second connection condition. In various embodiments, the controller may be configured to detect the first connection condition based on one or both of a determined proximity of the first end of the fall protection device to the workspace anchor and a detected presence of the first end of the fall protection device at the first connection location.

Various embodiments are directed to a method of detecting a workspace operating condition associated with a workspace, the method comprising: capturing, via an imaging device, imaging data associated with a workspace defined by a materials handling vehicle, the imaging data comprising at least one image of a first connection location corresponding to a workspace anchor and a second connection location corresponding to an operator attachment; detecting a workspace operating condition associated with the workspace based at least in part on the imaging data captured by the imaging device; wherein the workspace operating condition is defined at least in part by a first connection status of a fall protection device at the first connection location and a second connection status of the fall protection device at the second connection location.

In various embodiments, the imaging data may further comprise at least one image of an operator position location corresponding to an operating position defined within the workspace, and wherein detecting the workspace operating condition comprises detecting an operator position status at the operator position location, the first connection status, and the second connection status based at least in part on the imaging data. In various embodiments, the workspace operating condition may comprise a safe operating condition, and wherein detecting the safe operating condition comprises detecting that the first connection status is defined by a first connection condition between the fall protection device and the workspace anchor, detecting that the second connection status is defined by a second connection condition between the fall protection device and the operator attachment.

In various embodiments, the method may further comprise, upon detecting the workspace operating condition, causing an alert signal corresponding to the detected workspace operating condition to be transmitted from an operating condition indicator, the alert signal embodying an indicator of the detected workspace operating condition. In certain embodiments, detecting the workspace operating condition may comprise processing the imaging data captured by the imaging device by executing one or more machine learning operations to programmatically detect a first connection condition between the fall protection device and the workspace anchor at the first connection location and a second connection condition between the fall protection device and the operator attachment at the second connection location, wherein the first connection status is defined by the first connection condition and the second connection status is defined by the second connection condition. In certain embodiments, the workspace operating condition may comprise a danger operating condition, and detecting the danger operating condition may comprise detecting, based on the imaging data, that at least one of the first connection status and the second connection status is defined by a detached condition, wherein the danger operating condition corresponds to the fall protection device being provided in an at least partially uninstalled configuration.

BRIEF DESCRIPTION OF THE DRAWINGS

Reference will now be made to the accompanying drawings, which are not necessarily drawn to scale, and wherein.

DETAILED DESCRIPTION

Figure 1:
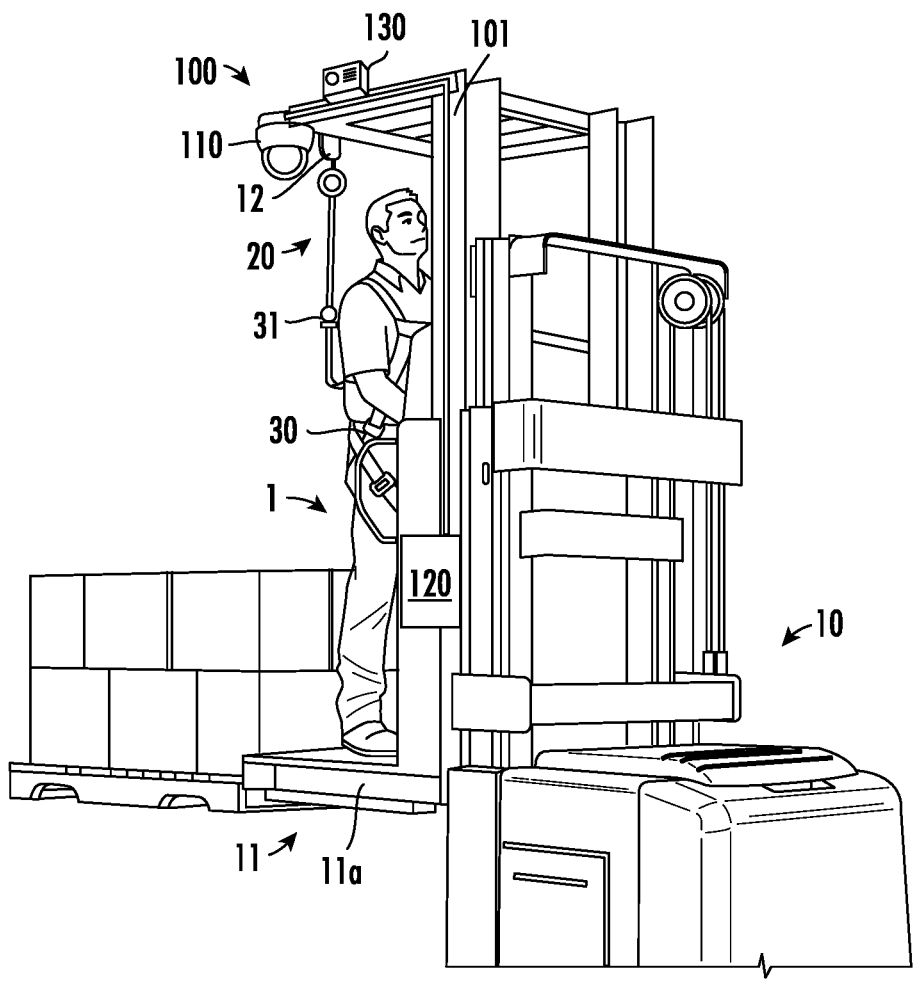
FIG. 1 illustrates a perspective view of an exemplary device for detecting an operating condition associated with fall protection equipment according to an example embodiment described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Picking or workstations are essential components of high volume distribution and fulfillment operations. Conventionally, order picking requires an order picker to take an order list, walk through racks of products filled with containers of products to pick from, picking the listed products from product containers, and placing the picked products into an order container for delivery to packaging. However, this solution is slow and requires intensive manpower. Thus, automated picking or workstations are used in more recent systems. For example, various materials handling vehicles comprising order pickers may be configured to move throughout a materials handling environment, a storage environment, and/or the like to retrieve objects from storage locations defined at various heights. Where such materials handling vehicles can be configured to raise a platform upon which an operator stands in an operating position during operation of the vehicle to an elevated height corresponding to the storage location, various industry safety standards have been developed that require the use of fall protection equipment configured to facilitate a secured connection of the operator (e.g., a harness being worn by the operator) to an anchored fastener on the materials handling vehicle. Often, however, installing the fall protection equipment in a fully installed configuration relative to both the operator and the picker may be a cumbersome process for an operator that requires the operator to spend time executing a number of installation steps prior to operating the picker, which may represent a costly loss of operation time in high volume distribution and fulfillment operations. As such, picker operators frequently forego using the required fall protection equipment, which can create an extremely dangerous operating condition with a high risk of serious operator injury, and may result in industry sanctions, regulatory punishments, and/or monetary damages based on a lack of compliance with established safety standards.

Various embodiments described herein are directed to apparatuses for detecting a workspace operating condition associated with a workspace. In various embodiments, the present invention includes a workspace operating condition detection apparatus that is configured to automatically detect one or more workplace operating conditions associated with a workspace defined by a materials handling vehicle. In various embodiments, workspace operating condition detection apparatus may comprise an imaging device configured to capture imaging data associated with a workspace, and a controller configured to detect the workspace operating condition associated with the workspace based at least in part on the imaging data captured by the imaging device. As described herein, the imaging data captured by the imaging device may comprise one or more images of a first connection location corresponding to a workspace anchor secured to the materials handling vehicle and configured to receive a first end of the fall protection device to anchor the fall protection device at the workspace anchor, and a second connection location corresponding to an operator attachment secured to a harness being worn by an operator and configured to receive a second end of the fall protection device to operatively attach the operator to the fall protection device at the operator attachment. The first connection location and the second connection location are defined within the workspace and the imaging device may be configured such that both the first and second connection locations are within a designated field of view. Accordingly, an exemplary workspace operating condition detection apparatus described herein may be configured to programmatically detect whether the fall protection device is in a fully installed configuration based at least in part on the imaging data captured by the imaging device. assembly workspace operating condition. For example, the present invention may include processing the imaging data captured by the imaging device by executing one or more machine learning operations to programmatically detect a first connection condition between the fall protection device and the workspace anchor at the first connection location and a second connection condition between the fall protection device and the operator attachment at the second connection location.

Further, as described herein, the present invention may be configured to detect a workspace operating condition associated with the workspace defined by the materials handling vehicle by further programmatically detecting the presence of an operator within the workspace (e.g., at an operating position therein) based on the imaging data captured by the imaging device. As described herein, the present invention may be configured to detect a workspace operating condition associated with a workspace, such as, for example, a disarmed operating condition, a standby operating condition, a safe operating condition, a blind spot operating condition, and/or a danger operating condition, based at least in part on a programmatic processing of the imaging data received from the imaging device in order to detect the first connection status, the second connection status, and the operator position status.

In various embodiments, an exemplary workspace operating condition detection apparatus described herein may further comprise an operating condition indicator positioned on the materials handling vehicle and electronically connected to the controller. In various embodiments, upon a workspace operating condition associated with the workspace being detected by the exemplary workspace operating condition detection apparatus based on the imaging data captured by the imaging device, the controller described herein may be configured to cause one or more alert signals corresponding to the detected workspace operating condition to be transmitted from the operating condition indicator of the exemplary workspace operating condition detection apparatus. For example, one or more alert signals comprising an audio and/or visual signal corresponding to the detected workspace operating condition may be transmitted from the operating condition indicator such that, upon transmission from the operating condition indicator, may embody a perceivable indication of the particular workspace operating condition (e.g., a light, a sound, a message, and/or the like, or any combination thereof) detected by the workspace operating condition detection apparatus and/or an instructional message corresponding to the detected workspace operating condition.

As described herein, the present invention includes utilizing an imaging device to capture imaging data associated with a workspace and programmatically processing the captured imaging data to facilitate a detection of a workspace operating condition associated with the workspace, a fall protection device, and/or an operator. The present invention utilizing the optical detection means described herein enables a workspace operating condition detection apparatus that is defined by reduced product costs relative to apparatuses that may utilize a plurality of other mechanical sensors distributed about the workspace to determine a condition defined therein. Further, the present invention is configured to at least substantially continuously monitor the workspace operating condition associated with the workspace of the materials handling vehicle and transmit corresponding alert signals in substantially real-time as an indication of the workspace operating condition defined by the materials handling vehicle at a particular instance. Accordingly, as described herein, the present invention drastically reduces the risk of a materials handling vehicle being deliberately and/or unintentionally operated in a dangerous and/or non-compliant manner.

FIG. 1 illustrates a perspective view of an exemplary apparatus for detecting an operating condition associated with fall protection device. In particular, FIG. 1 illustrates a perspective view of an exemplary workspace operating condition detection apparatus configured to detect a workspace operating condition, such as, for example, a safe operating condition, associated with a fall protection device based on captured image-based data corresponding to the installation of the fall protection device relative to the operator coupling element (e.g., at an operator-worn harness) and a workspace anchor (e.g., a materials handling vehicle anchor). In various embodiments, for example, an exemplary workspace operating condition detection apparatus 10 may be configured to detect a workspace operating condition associated with a fall protection device 20 configured for use within a workspace defined by a materials handling vehicle 10. For example, a materials handling vehicle 10, such as, for example, an order picker, may be used by a human operator 1 within a materials handling environment (e.g., a storage warehouse) to facilitate the retrieval and/or storage of an object to and/or from a storage location located at an elevated height above the ground floor. An exemplary materials handling vehicle 10 may comprise a lift configured to be selectively moveable in a vertical direction to a plurality of vertical heights in order to facilitate the storage and/or retrieval of an object from an elevated storage location. The lift of the materials handling vehicle 10 may comprise a lift platform 11a upon which an operator 1 may stand as the lift is moved between various vertical heights in order to enable the operator to assist in the storage and/or retrieval operation from the elevated storage location. In various embodiments, the materials handling vehicle 10 comprises a workstation 11 at which the operator 1 may stand in an operating position in order to operate (e.g., drive, lift, and/or otherwise control) the materials handling vehicle 10. In various embodiments, as illustrated, the workstation 11 of the materials handling vehicle 10 may be defined on the lift platform 11a, such that the operating position of the materials handling vehicle 10 is defined by the operator 1 standing on the lift platform 11a in a front-facing position towards the vehicle operation controls (e.g., user controls accessible to an operator 1 standing in the operating position that are configured to facilitate operation of the drive assembly and the lift assembly of the materials handling vehicle 10).

To maintain compliance with various safety standards, protocols, and/or the like designed mitigate the risk of personal injury associated with an operator working at an elevated height, an operator 1 may use one or more items of personal protective equipment (PPE) defining fall protection equipment (FPE), such as, for example, a fall protection device 20 and a wearable harness 30. In various embodiments, a fall protection device 20 (e.g., a personal fall limiter) may be used to operably secure an operator 1 wearing a harness 30 relative to one or more anchors points. For example, as illustrated, a fall protection device 20 may be configured to operably attach the operator 1 to a workspace anchor 12 positioned above the workspace 11 defined by the materials handling vehicle 10, such as, for example, on a top portion of the lift that is configured to move vertically with the platform 11a such that the workspace anchor 12 maintains a position above the operator 1 throughout operation of the materials handling vehicle 10. The fall protection device 20 may be configured for coupling (e.g., at a first end thereof) to the workspace anchor 12 so as to define a first connection location of the fall protection device 20. Further, the fall protection device 20 may be configured for coupling (e.g., at a second end thereof) to a harness 30 being worn by the operator 1 so as to define a second connection location of the fall protection device 20 and facilitate the anchoring of the operator 1 relative to the workspace anchor 12 via the fall protection device 20. For example, FIG. 1 illustrates an exemplary fall protection device 20 in a fully installed configuration, wherein the fall protection device 20 is connected to both the workspace anchor 12 and an operator harness 30 being worn by an operator 1 standing in an operating position. In various embodiments, the fully installed configuration of the fall protection device 20 may be defined by a first connection of the fall protection device 20 to the workspace anchor 12 (e.g., at the first connection location) and a second connection of the fall protection device 20 to the harness 30 (e.g., at the second connection location).

It should be understood that many types and configurations of safety/fall harnesses are known in the PPE and FPE industry, including full body harnesses and partial or hip/waist fall harnesses, all, or most, of which are suitable for use with the concepts disclosed herein. Accordingly, the wearable safety harness 30 depicted in FIG. 1 is provided for purposes of illustration and further specific details of the harness 20 will not be discussed herein except for those required for an understanding of the disclosed concepts, and that the appended claims are not limited to any specific details of a harness unless expressly recited in the claims.

In various embodiments, a workspace operating condition detection apparatus may be installed relative to a workspace and configured to detect a workspace operating condition defined at least in part by a configuration of a fall protection device. For example, as illustrated in FIG. 1, an exemplary workspace operating condition detection apparatus 100 may be installed relative to a materials handling vehicle 10 and configured to detect a workspace operating condition within the workspace 11, wherein the workspace operating condition is defined at least in part by one or more connection statuses of the fall protection device 20 at a corresponding one or more connection locations. As a non-limiting example, the workspace operating condition detection apparatus 100 may be configured to detect a safe operating condition defined at least in part by the fall protection device 20 being arranged in a fully-installed configuration, as described herein.

In various embodiments, a workspace operating condition detection apparatus 100 may comprise an imaging device 110 configured to capture imaging data associated with the fall protection device 20 and/or the workspace 11 and a controller 120 in communication with the imaging device 110 and configured to detect a workspace operating condition based at least in part on imaging data received from the imaging device 110. In various embodiments, the imaging device 110 may be configured to capture imaging data comprising at least one image that, individually and/or collectively, shows each of the connection locations that define the installation configuration of the fall protection device 20. In various embodiments, the imaging device 110 may be further configured to capture imaging data comprising at least one image that individually and/or collectively shows an operator position location associated with an operator 1 and at least one connection locations associated with a fall protection device 20. In various embodiments, the imaging device 110 may at least substantially continuously, serially, and/or periodically capture image data including a plurality of images and/or the like that may be at least substantially continuously processed (e.g., by the controller 120) and/or analyzed such that the exemplary workspace operating condition detection apparatus 100 is configured to at least substantially continuously monitor a plurality of workspace and/or operator configurations embodying outputs that may utilized to collectively determine and/or define a workspace operating condition at a plurality of instances in series. For example, such an exemplary configuration may facilitate a robust configuration that functions to maximize the operational reliability (e.g., accuracy) of the workspace operating condition detection apparatus 100 in determining the workspace operating condition at a particular instance. As a nonlimiting example, the workspace operating condition detection apparatus 100 may be configured to determine that a particular workspace operating condition is present upon detecting that workspace operating condition at least substantially continuously for a predetermined amount of time or for a predetermined number of consecutive instances.

In various embodiments, the imaging device 110 may be fixedly secured relative to the materials handling vehicle 10. For example, as illustrated, the imaging device 110 may be secured to the materials handling device 10 at a top portion of a frame that is configured for movement with the workspace 11 (e.g., the platform 11a) such that the imaging device 110 does not move relative to the workspace 11. In various embodiments, the imaging device 110 may be electronically connected to the controller 120 of the exemplary workspace operating condition detection apparatus 100 by circuitry 101. For example, the controller 120 may be electrically connected to a power source and/or one or more internal circuitries of the materials handling vehicle, so as to enable distribution of power through the controller 120 to the components of the workspace operating condition detection apparatus 100 in communication therewith, such as, for example, the imaging device 110 and the operating condition indicator 130. Alternatively, or additionally, the imaging device 110 may be electrically connected to the power circuitry 101 of the materials handling vehicle 10 such that the imaging device 110 may be powered by a power signal supplied by the power supply of the materials handling vehicle 10. As described herein, in various embodiments, the imaging device 110 may be configured to transmit at least a portion of the imaging data captured by the imaging device 110 to the controller 120 via the electronic communication defined therebetween.

In various embodiments, an exemplary controller 120 may be in electronically connected to the imaging device 110 such that the controller 120 is configured to receive the captured imaging data from the imaging device 110 and, based at least on part on the captured imaging data, detect a workspace operating condition associated with the workspace 11 (e.g., the materials handling vehicle 10). For example, as described in further detail herein, the controller 120 may be configured to execute one or more data processing operations, such as, for example, one or more machine learning techniques, with respect to the imaging data received from the imaging device 110 to programmatically determine one or more conditions (e.g., characteristics) associated with the fall protection device 20 and/or the operator 1. As described in further detail herein the controller 120 may be configured to detect a workspace operating condition associated with a workspace 11, such as, for example, a disarmed operating condition, a standby operating condition, a safe operating condition, a blind spot operating condition, and/or a danger operating condition, based at least in part on the imaging data received from the imaging device 110. For example, one or more machine learning techniques may be executed with respect to the imaging data to detect that a fall protection device 20 is installed in a fully installed configuration by programmatically detecting a first connection condition at a first connection location corresponding to a workspace anchor 12 and a second connection condition at a second connection location corresponding to an operator attachment 31.

In various embodiments, the workspace operating condition detection apparatus 100 may further comprise an operating condition indicator 130 configured to receive one or more signals corresponding to the detected workspace operating condition from the controller 120 and transmit at least one indication thereof, such as, for example, an audio indication signal, a visual indication signal, and/or any other appropriate signal that may be transmitted by the operating condition indicator 130 and perceived by the operator 1 and/or another party (e.g., a nearby worker, a manager, a safety coworker). In various embodiments, an operating condition indicator 130 may comprise one or more LEDs configured to be selectively operated based at least in part on an indicator signal received by the operating condition indicator 130 from the controller 120. For example, the operating condition indicator 130 may comprise a plurality of LEDs, each being configured to selectively powered to cause an alert signal comprising a visual signal (e.g., an emitted light) that that corresponds to a particular workspace operating condition to be transmitted from the operating condition indicator 130. Further, in various embodiments, the operating condition indicator 130 may be configured to transmit an alert signal comprising a perceivable audio signal (e.g., via an integrated a speaker component and/or the like) that is configured to emit a predetermined sound, instructional message, and/or the like, or any combination thereof that corresponds to the workspace operating condition detected by the controller 120. In various embodiments, the operating condition indicator 130 may be integrated as part of the imaging device, such as, for example, as a component within the same housing as the imaging device 110 attached to the materials handling vehicle at substantially the same location.

Figure 2:
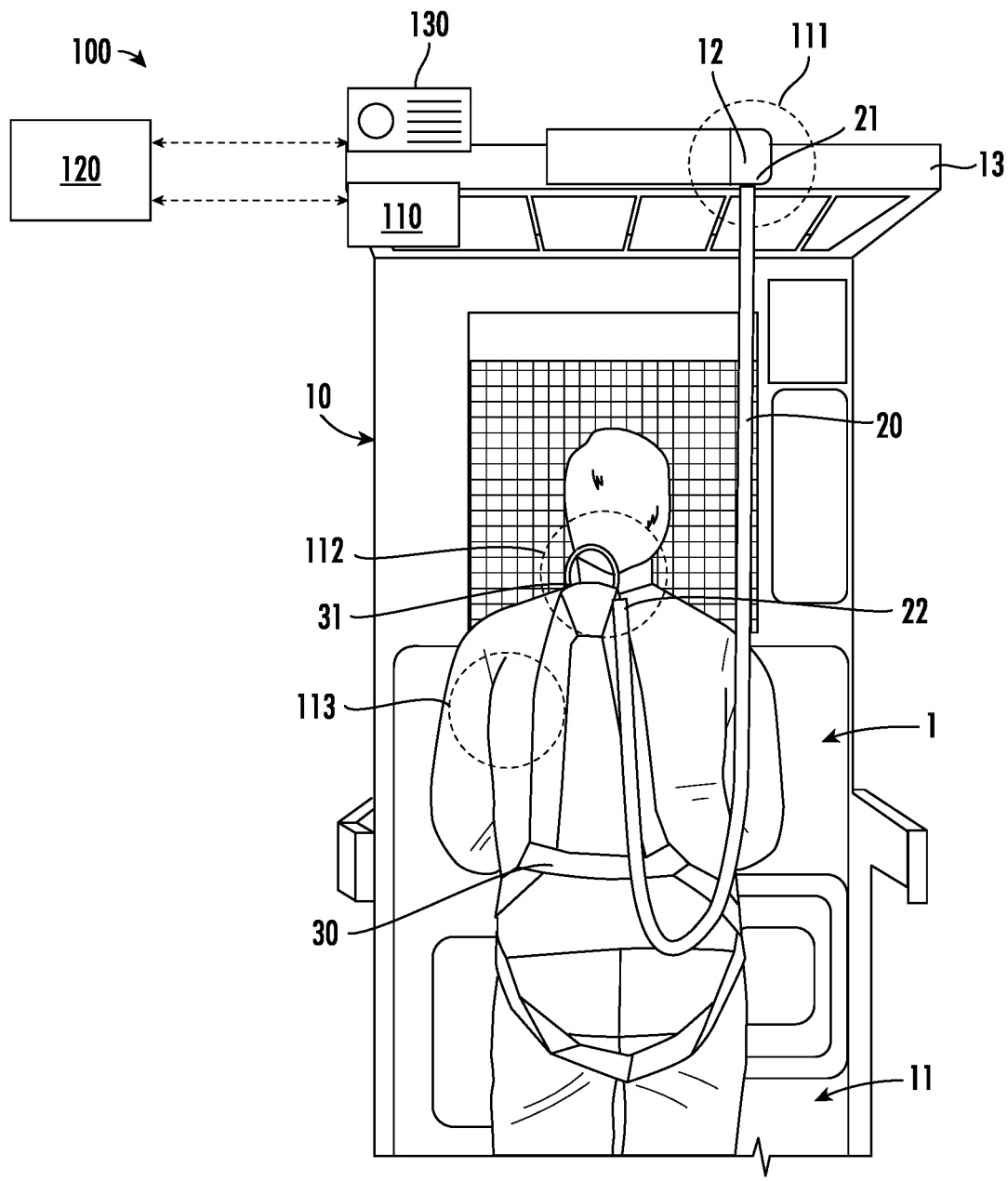
FIG. 2 illustrates a perspective view of an exemplary device for detecting an operating condition associated with fall protection equipment according to an example embodiment described herein.

As illustrated in FIG. 2, an exemplary workspace operating condition detection apparatus 100 may comprise an imaging device 110 that is secured to the materials handling device 10 relative to the workspace in a position wherein the imaging device 110 may have a direct line of sight to the workspace 11 defined by the materials handling vehicle 10, such as, for example, along a top frame portion 13 (e.g., a ceiling) of the materials handling vehicle 10. In various embodiments, the imaging device 110 may further be secured to the top frame portion 13 in a rearward position at a back portion of the materials handling vehicle 10 such that, upon an operator 1 being positioned at an operating position within the workspace 11 (e.g., in a forward-facing orientation) the imaging device 110 may have an at least substantially direct line of sight to the back of the operator 1 (e.g., an operator attachment secured at the back of a harness 30 being worn by the user 1).

In various embodiments, the imaging device 110 may comprise an imaging component, such as, for example, a camera having a resolution of at least 720p and being configured to capture imaging data comprising videos, images, and/or the like, an optical lens configured to define a field of view of the imaging device 110, an imaging device processing unit, various internal circuitries configured to the facilitate power management and connectivity and/or networked communication of the imaging device. In various embodiments, the optical lens of the imaging device may be configured such that the field of view of the imaging device may be at least approximately between 45 degrees and 180 degrees. Further, in various embodiments, the imaging device 110 may include a protective housing, such as, for example, a plastic dome configured to provide coverage over the other imaging device components for protection thereof. In various embodiments, the imaging device processing unit of the imaging device 110 may comprise a neural accelerator. In various embodiments, the imaging device processing unit of the imaging device 110 may comprise one or more hardware components and/or circuitries that are distinct from the controller 120 of the workspace operating condition detection apparatus 100. Alternatively, or additionally, in various embodiments, one or more hardware components, circuitries, and/or functionalities of the imaging device processing unit of the imaging device 110 may be defined by the controller 120, as described herein, such that the imaging device processing unit of the imaging device 110 may be defined as part of the controller 120. In various embodiments, the imaging device 110 may comprise one or more EDGE artificial intelligence (AI) components that may comprise distinct hardware and/or circuitries in communication with the controller 120, or, alternatively, may comprise various hardware and/or circuitries that define part of the controller 120. As non-limiting examples provided for illustrative purposes, in various embodiments, the one or more EDGE AI component may comprise one or more of a k210 accelerator on a MAIX1 module, a V831 SoC on a MAIX2 module, a MAX78000 SoC, and/or the like, and may be configured to utilize a OpenCV AI Kit Lite as a hardware platform.

In various embodiments, the imaging device 110 may have a designated field of view for capturing, permanently and/or temporarily, one or more images of a workspace 11 defined by the materials handling vehicle 10. For example, in various embodiments, the imaging device 110 may be configured such that at least a portion of the workspace 11 including a first connection location 111, a second connection location 112, and an operator position location 113 is within the designated field of view. For example, the first connection location 111, the second connection location 112, and the operator position location 113 may each be locations within the workspace 11 at which a condition associated with the workspace may be defined based at least in part on a configuration of a fall protection device 20 and/or an operator 1 positioned therein. For example, in various embodiments, a first connection status associated with the fall protection device 20 may be defined based at least in part on a detected arrangement of the fall protection device 20 (e.g., a first end 21 thereof) relative to a workspace anchor 12 at the first connection location 111. In various embodiments, the workspace anchor 12 may comprise a fastening means fixedly secured to the materials handling vehicle 10 (e.g., at a top portion thereof) and configured for coupling to a first end 21 of the fall protection device 20, such as, for example a hook, a latch, a pin, a carabiner, and/or any other applicable fastening means configured to facilitate coupling of the fall protection device 20 thereto.

In various embodiments, the first connection location 111 may correspond to a position of the workspace anchor 12, such that a detection of the first connection status associated with the fall protection device 20 at the first connection location 111 may be used to detect whether a first end 21 of the fall protection device 20 is anchored to the workspace anchor 12. In various embodiments, each of the workspace anchor 12 and the first end 21 of the fall protection device 20 may include an attachment portion that is configured to facilitate a connection therebetween and further comprises at least one optically distinguishable portion configured to facilitate optical identification of the attachment portion at the first connection location 111 by the imaging device 110 and/or the controller 120 in order to facilitate detection of the first connection status. As non-limiting examples, various optically distinguishable portions may comprise a distinct color, texture, material, pattern, and/or any other distinguishing feature that may be visually detected and distinguishable from a remaining portion of the workspace anchor 12 and/or the first end 21 of the fall protection device 20. For example, in such an exemplary circumstance, a proximity of the first end 21 relative to the workspace anchor 12 may be determined based at least in part on a detected proximity of an optically distinguishable portion of the attachment portion of the first end 21 relative to an optically distinguishable portion of the attachment portion of the workspace anchor 12.

Further, in various embodiments, a second connection status associated with the fall protection device 20 may be defined based at least in part on a detected arrangement of the fall protection device 20 (e.g., a second end 22 thereof) relative to an operator attachment 31 at the second connection location 112. In various embodiments, the second connection location 112 may correspond to a position of the operator attachment 31 (e.g., a harness attachment attached to a back of a harness being worn by an operator) such that a detection of the second connection status associated with the fall protection device 20 at the second connection location 112 may be used to detect whether a second end 22 of the fall protection device 20 is attached to the operator attachment 31. In various embodiments, the operator attachment 31 may comprise a safety component secured relative to the harness 30 and configured for coupling to a second end 22 of the fall protection device 20, such as, for example a D-ring, a carabiner, and/or any other applicable fastening means. As described herein, imaging data captured by the imaging device 110 that includes one or more images showing the first connection location 111 and the second connection location 112 may be used to detect a first connection status and a second connection status, respectively, which may be used by the workspace operating condition detection apparatus 100 to detect whether the fall protection device 20 is installed in a fully installed configuration, as described herein. In various embodiments, the operator attachment 31 may comprise a safety component secured relative to the harness 30 and configured for coupling to a second end 22 of the fall protection device 20, such as, for example a D-ring, a carabiner, and/or any other applicable fastening means.

In various embodiments, the second connection location 112 may correspond to a position of the operator attachment 31, such that a detection of the second connection status associated with the fall protection device 20 at the second connection location 112 may be used to detect whether a second end 22 of the fall protection device 20 is attached to the operator attachment 31 so as to be operatively attached to the operator 1 wearing the harness 30. In various embodiments, each of the operator attachment 31 and the second end 22 of the fall protection device 20 may include an attachment portion that is configured to facilitate a connection therebetween and further comprises at least one optically distinguishable portion configured to facilitate optical identification of the attachment portion at the second connection location 112 by the imaging device 110 and/or the controller 120 in order to facilitate detection of the second connection status. For example, an optically distinguishable portion may comprise a distinct color, texture, material, pattern, and/or any other distinguishing feature that may be visually detected and distinguishable from a remaining portion of the operator attachment 31 and/or the second end 21 of the fall protection device 20. For example, in such an exemplary circumstance, a proximity of the second end 22 relative to the operator attachment 31 may be determined based at least in part on a detected proximity of an optically distinguishable portion of the attachment portion of the second end 22 relative to an optically distinguishable portion of the attachment portion of the operator attachment 31.

Further, in various embodiments, an operator position status associated with the operator 1 may be defined based at least in part on a detected arrangement of the operator 1 (e.g., an operator presence and/or an operator orientation) relative to an operating position at the operator position location 113. In various embodiments, the operator position location 113 may correspond to a position within the workspace 11 that may be occupied by an operator's body when the operator 1 is positioned in the operating position within the workspace 11. As described herein, a detection of the operator position status associated with the operator 1 based on a condition (e.g., an occupied workspace condition, an unoccupied workspace condition, an out-of-position operator condition) detected at the operator position location 113 may be used to detect whether an operator is present within the workspace 11 and/or whether an operator 1 present within the workspace 11 is positioned in an operating position. For example, imaging data captured by the imaging device 110 that includes one or more images showing the operating position location 113 may be used to detect an occupied workspace condition at the operator position location 113, which may define the operator position status used by the workspace operating condition detection apparatus 100 to detect that the operator 1 is present within the workspace 11 of the materials handling vehicle 10. In various embodiments, the field of view of the imaging device 110 may be configured such that the imaging data captured by the imaging device 110 may include one or more images of the operator position location 113 such that the imaging device 110 is configured to capture imaging data showing an operator position status of the operator 1 defined by the presence and/or positioning of the operator 1 at the operator position location 113 (e.g., within the workspace 11 on the materials handling vehicle 10). For example, in various embodiments, the imaging device 110 may capture imaging data of the operator position location 113 that may be processed by the workspace operating condition detection apparatus 100 (e.g., the controller 120) in order to determine one or more positional characteristics of the operator 1, such as, for example, an operator presence within the operator position location 113, an operator orientation relative to an operating position (e.g., forward-facing, rearward-facing), and/or the like. In such an exemplary circumstance, as a non-limiting example, the controller 120 may be configured to detect the operator position status of the operator 1 based at least in part on the detected presence of at least a portion of the body of the operator 1 at the operator position location 113. As described herein, in various embodiments, the imaging device 110 may at least substantially continuously, serially, and/or periodically capture image data that may be at least substantially continuously processed (e.g., by the controller 120) to at least substantially continuously monitor and/or determine a plurality of image data outputs, such as, for example, at least a first connection between the first end 21 of the fall protection device 20 at the first connection location 111, a second connection between the second end 22 of the fall protection device 20 and the operator attachment 31 at the second connection location 112, and one or more positional characteristics of the operator 1, which that may utilized to collectively determine and/or define a workspace operating condition at a particular instance (e.g., instantaneously) and/or at a plurality of sequential instances (e.g., serially).

Figure 3:
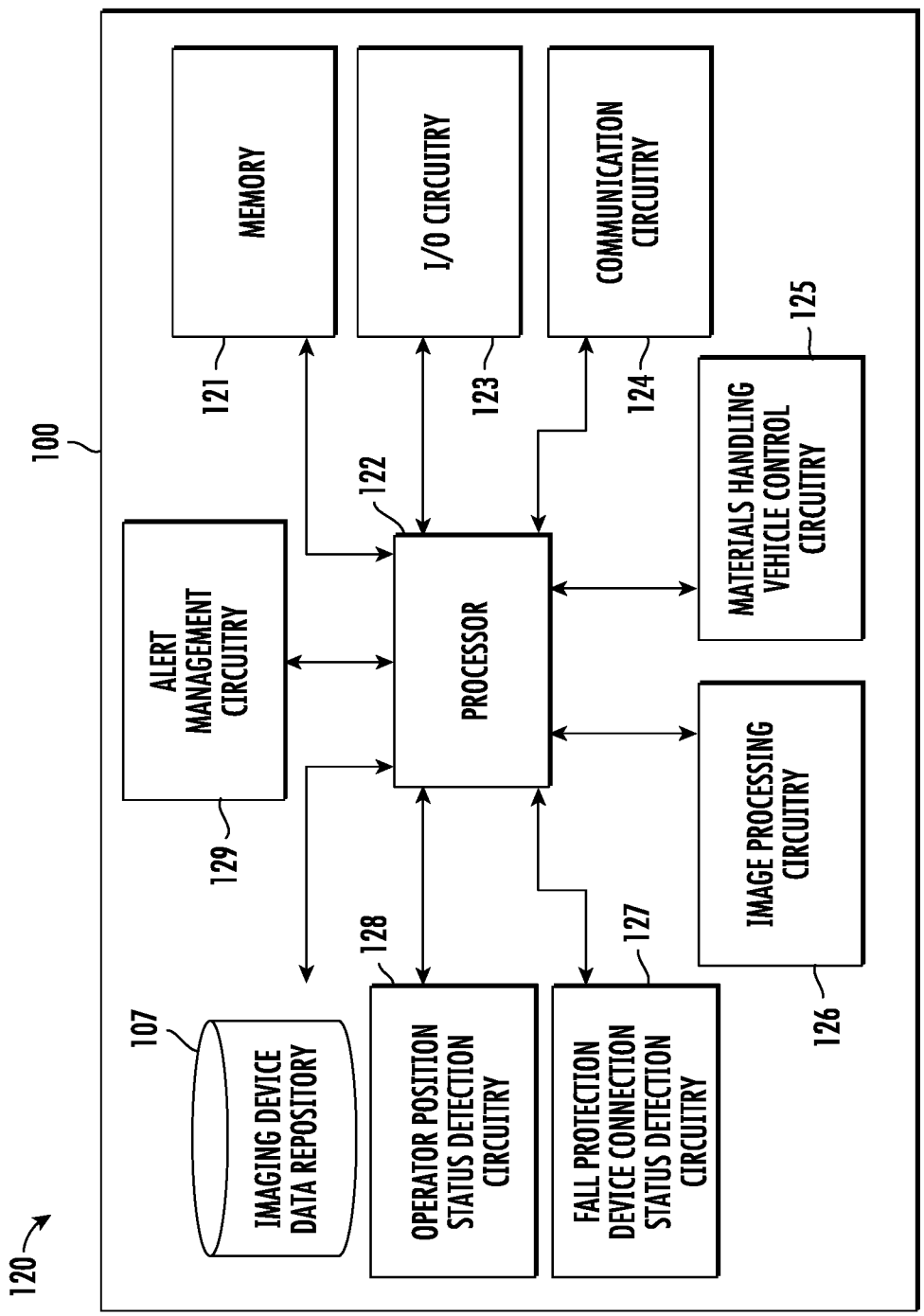
FIG. 3 illustrates a schematic view of an exemplary apparatus in accordance with various embodiments.

As illustrated in FIG. 3, an exemplary workspace operating condition detection apparatus 100 may comprise a controller 120 comprising a memory 121, a processor 122, input/output circuitry 123, communication circuitry 124, an imaging device data repository 107, materials handling vehicle control circuitry 125, image processing circuitry 126, fall protection device connection status detection circuitry 127, operator position status detection circuitry 128, and alert management circuitry 129. The controller 120 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the controller 120 may provide or supplement the functionality of particular circuitry. For example, the processor 122 may provide processing functionality, the memory 121 may provide storage functionality, the communication circuitry 124 may provide network interface functionality, and the like.

In some embodiments, the processor 122 (and/or co-processor or any other processing circuitry assisting or otherwise associated with the processor) may be in communication with the memory 121 via a bus for passing information among components of the apparatus. The memory 121 may be non-transitory and may include, for example, one or more volatile and/or non-volatile memories. For example, the memory 121 may be an electronic storage device (e.g., a computer readable storage medium). In various embodiments, the memory 121 may be configured to store information, data, content, applications, instructions, or the like, for enabling the apparatus to carry out various functions in accordance with example embodiments of the present disclosure. It will be understood that the memory 121 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 121 may be configured to store imaging data captured by the imaging device of the workspace operating condition detection apparatus 100, corresponding data generated by the controller 120 of the workspace operating condition detection apparatus 100, timestamp data, location data, historical data and/or the like, associated with a workspace (e.g., a materials handling vehicle).

The processor 122 may be embodied in a number of different ways and may, for example, include one or more processing devices configured to perform independently.

Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 122 may be configured to execute instructions stored in the memory 121 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the controller 120 may include input-output circuitry 123 that may, in turn, be in communication with the processor 122 to provide output to a user and, in some embodiments, to receive input such as a command provided by the user. The input-output circuitry 123 may comprise a user interface, such as a graphical user interface (GUI), and may include a display that may include a web user interface, a GUI application, a mobile application, a client device, or any other suitable hardware or software. In some embodiments, the input-output circuitry 123 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, or a combination thereof), or other input-output mechanisms. The processor 122, input-output circuitry 123 (which may utilize the processing circuitry), or both may be configured to control one or more functions of one or more user interface elements through computer-executable program code instructions (e.g., software, firmware) stored in a non-transitory computer-readable storage medium (e.g., memory 121). Input-output circuitry 123 is optional and, in some embodiments, the controller 120 may not include input-output circuitry. For example, in various embodiments, the controller 120 may generate one or more alert signals (e.g., data) to be transmitted to one or more other devices with which one or more authorized users (a manager, safety coordinator, and/or the like) directly interact and cause the one or more alert signals to be transmitted at the one or more other devices.

The communication circuitry 124 may be a device or circuitry embodied in either hardware or a combination of hardware and software that is configured to receive and/or transmit data from/to a network and/or any other device, circuitry, or module in communication with the controller 120. For example, the communication circuitry 124 may be configured to communicate with one or more computing devices via wired (e.g., USB) or wireless (e.g., Bluetooth, Wi-Fi, cellular, and/or the like) communication protocols. For example, in various embodiments, the communication circuitry 124 may be configured to facilitate data communication between an exemplary workspace operating condition detection apparatus 100 and one or more external computing devices via wired (e.g., USB, ethernet, and/or the like) and/or wireless (e.g., Bluetooth, Wi-Fi, cellular, and/or the like) communication protocols.

In various embodiments, the processor 122 may be configured to communicate with the materials handling vehicle control circuitry 125. The materials handling vehicle control circuitry 125 may be a device or circuitry embodied in either hardware or a combination of hardware and software that is configured to facilitate an operation of a materials handling vehicle 10 by generating a control signal configured to operate one or both of a drive assembly and a lift assembly of the materials handling vehicle 10 in response to an interaction of an operator 1 with one or more vehicle operation controls (e.g., user controls) of the materials handling vehicle 10 from an operating position within a workspace 11. In various embodiments, the materials handling vehicle control circuitry 125 may be configured to receive a first control signal based on operator interaction with the vehicle operation controls of the materials handling vehicle 10 and, in response, transmit a corresponding signal to one or more circuitries of the controller 120, such as, for example, the fall protection device connection status detection circuitry 127, the operator position status detection circuitry 128, and/or the alert management circuitry 129, in order to facilitate detection of a workspace operating condition (e.g., a danger operating condition) based at least in part on the materials handling vehicle 10 being operated by the operator. As a non-limiting example provided for illustrative purposes, in an exemplary circumstance wherein the workspace operating condition detection apparatus 100 is in a standby operating condition, as described herein, and the materials handling vehicle control circuitry 125 receives a first control signal embodying a user operation of the drive assembly and/or the lift assembly of the materials handling vehicle 10, the materials handling vehicle control circuitry 125 may be configured to transmit a corresponding signal to the fall protection device connection status detection circuitry 127, the operator position status detection circuitry 128, and/or the alert management circuitry 129 so as to enable detection of a danger operating condition defined by the materials handling vehicle 10 being operated (e.g., based on a control signal) while the workspace operating condition detection apparatus 100 is in a standby operating condition (e.g., wherein the operator 1 is positioned within the workspace 11 while the fall protection harness 20 is arranged in an at least partially uninstalled configuration).

In various embodiments, at least a portion of the controller 120, such as, for example, at least a portion of the materials handling vehicle control circuitry 125 and/or the processor 122 may be at least substantially integrated with the circuitry of the materials handling vehicle itself. For example, in various embodiments, one or more signals generated by the controller 120 (e.g., from the materials handling vehicle control circuitry 125, the communications circuitry 124, and/or the processor 122) in association with a workspace operating condition may comprise a lead signal that may be received by the materials handling vehicle circuitry (e.g., controls) and configured to cause the materials handling vehicle to be controlled and/or operated in accordance with the lead signal. As a further example, in various embodiments, one or more signals generated by the controller 120 (e.g., from the materials handling vehicle control circuitry 125, the communications circuitry 124, and/or the processor 122) in association with a workspace operating condition may comprise a slave signal that may be generated in response to one or more signals received from the materials handling vehicle circuitry (e.g., controls). Additionally, or alternatively, in such an exemplary system architecture wherein the controller 120 is configured to generate a slave signal that is received by the materials handling vehicle (e.g., controls), the slave signal may comprise a passive and/or informative data signal that is not configured to directly cause a reactive operation and/or action by the by the materials handling vehicle circuitry, but rather may be configured for processing by the materials handling vehicle, which may be configured to generate a reactionary signal based at least in part on the data contained in the slave signal.

In various embodiments, the processor 122 may be configured to communicate with the image processing circuitry 126. The image processing circuitry 126 may be a device and/or circuitry embodied in either hardware or a combination of hardware and software that is configured to receive, process, generate, and/or transmit data (e.g., imaging data), such as one or more images, videos, and/or the like captured by an imaging device 110 of the exemplary workspace operating condition detection apparatus 100. In various embodiments, the image processing circuitry 126 may be further configured to analyze the one or more images captured by the imaging device 110 using at least one processing technique to determine one or more characteristics of a condition captured in the one or more images, such as, for example, a proximity (e.g., a distance) of one or both of a first end 21 and a second end 22 of the fall protection device 20 to a corresponding attachment (e.g., workspace anchor 12, operator attachment 31) at a first connection location 111 and a second connection location 112, respectively, as described herein.

Further, in various embodiments, the image processing circuitry 126 may be further configured to analyze the one or more images captured by the imaging device 110 using at least one processing technique to determine one or more characteristics of a condition captured in the one or more images, such as, for example, an interconnection configuration between a first end 21 the fall protection device 20 and a workspace anchor 12 at a first connection location 111 and/or between a second end 22 of the fall protection device 20 and operator attachment 31 at a second connection location 112. For example, in various embodiments, the image processing circuitry 126 may detect an interconnection configuration between a first end 21 the fall protection device 20 and a workspace anchor 12 by determining whether a first end 21 comprising an at least substantially looped configuration is interconnected with a workspace anchor 12 that also has an at least substantially looped configuration. In various embodiments, the interconnection configuration between the first end 21 of the fall protection device 20 (e.g., a first looped component) and the workspace anchor 12 (e.g., the second looped component) may be based at least in part on a detected overlap between the two looped components. For example, in an exemplary circumstance wherein the image processing circuitry 126 detects that either the first end 21 of the fall protection device 20 or the workspace anchor 12 is in a fully overlapping configuration relative to the other, such as, for example, by detecting that at least substantially all of one of the first end 21 or the workspace anchor 12 is arranged in between the imaging device 110 and the other looped component, the image processing circuitry 126 may determine that the interlocking configuration between the two looped components is defined by a non-interlocked configuration. Alternatively, or additionally, such that in an exemplary circumstance wherein the image processing circuitry 126 detects that the first end 21 of the fall protection device 20 and the workspace anchor 12 are in a partially overlapping configuration relative to the other, wherein a first portion (e.g., a first radial portion) of the first end 21 is arranged in between the imaging device 110 and a first portion of the workspace anchor 12 while a second portion (e.g., a second radial portion) of the workspace anchor 12 is arranged in between the imaging device 110 and a second portion of the first end 21, the image processing circuitry 126 may determine that the interlocking configuration between the two looped components is defined by a interlocked configuration. In various embodiments, the image processing circuitry 126 may similarly be configured to detect the above describe interlocking configuration of the between a second end 22 of the fall protection device 20 and operator attachment 31 at a second connection location 112 based at least in part on the overlapping arrangement of the respective looped components of the second end 22 of the fall protection device 20 and operator attachment 31 relative to the imaging device 110.

Further still, in various embodiments, the image processing circuitry 126 may be further configured to analyze the one or more images captured by the imaging device 110 to detect an operator presence within a workspace 11 of the materials handling vehicle 10, such as, for example, using one or more machine learning techniques. In various embodiments, the controller 120 (e.g., the image processing circuitry 126) may be configured to detect a first connection condition associated with a workspace based on one or more of a determined proximity of a first end of the fall protection device to the workspace anchor, the determined interconnection orientation between the first end of the fall protection device and the workspace anchor, and a detected presence of the first end of the fall protection device at the first connection location.

In various embodiments, for example, upon processing various imaging data captured by the imaging device 110 to determine a proximity and/or an interconnection configuration between the fall protection device 20 and a corresponding attachment point, the image processing circuitry 126 may be configured to generate corresponding data that may be stored by the workspace operating condition detection apparatus 100 (e.g., at the imaging device data repository 107 associated therewith) in a supported format that facilitates interaction therewith and/or retrieval thereof by the workspace operating condition detection apparatus 100 as part of one or more machine learning operations. In various embodiments, as a non-limiting illustrative example, the one or more machine learning techniques used by the image processing circuitry 126 to determine a proximity condition and/or an interconnection configuration defined by the fall protection device 20 and a corresponding attachment point, an operator presence within a workspace 11 of the materials handling vehicle 10 (e.g., an occupied workspace condition), and/or the like, may comprise using deep supervised learning with one or more labeled datasets of one or more known characteristics and/or conditions, such as, for example, known distances, arrangements, profiles, materials, colors, depths, and/or any other data generated, transmitted, and/or received by the controller 120.

In various embodiments, the image processing circuitry 126 may send and/or receive imaging data captured by the imaging device 110 and/or corresponding data associated therewith generated in a supported format by the image processing circuitry 126 to and/or from the imaging device data repository 107.

Further, in various embodiments, the image processing circuitry 126 may be configured to analyze imaging data comprising one or more images captured by the imaging device 110 of the workspace operating condition detection apparatus 100 to detect and/or characterize a change in one or more conditions (e.g., characteristics, configurations, and/or the like) between a first time and a second time, such as, for example, a change in proximity between a first fall protection device end a workspace anchor at the first connection location, a change from an unoccupied workspace condition to an occupied workspace condition, and/or the like. The image processing circuitry 126 may receive from the imaging device 110, for example, a first captured image and a second captured image, captured at the first time and the second time, respectively, wherein the second time is subsequent the first time (occurs after the first time). In such a configuration, the image processing circuitry 126 may be configured to distinguish between a first condition as defined in the first captured image and a second condition as defined in the second captured image by comparing the respective images captured at the first and second times and identifying any characteristics, configurations, and/or conditions that were at least substantially different as defined in the second captured image.

In various embodiments, the processor 122 may be configured to communicate with the fall protection device connection status detection circuitry 127. The fall protection device connection status detection circuitry 127 may be a device and/or circuitry embodied in either hardware or a combination of hardware and software that is configured to receive, process, generate, and/or transmit data (e.g., imaging data), such as imaging data captured by workspace operating condition detection apparatus 100 (e.g., via an imaging device 110) and/or data corresponding thereto in order to detect one or more connection statuses associated with a fall protection device. In various embodiments, based on at least a portion of the imaging data captured by the imaging device 110 and/or corresponding supported data received from the image processing circuitry 126 (e.g., data associated with the first end of the fall protection device and/or the first detection location), the fall protection device connection status detection circuitry 127 may be configured to detect a first connection status associated with the fall protection device (e.g., the first end thereof) as defined at the first connection location corresponding to a workspace anchor. For example, in various embodiments, a connection status may be defined based on a detected connection condition or a detected detached condition at a connection location associated with a fall protection device. Further, based on at least a portion of the imaging data captured by the imaging device 110 and/or corresponding supported data received from the image processing circuitry 126 (e.g., data associated with the second end of the fall protection device and/or the second connection location), the fall protection device connection status detection circuitry 127 may be configured to detect a second connection status associated with the fall protection device (e.g., the second end thereof) defined at the second connection location corresponding to an operator attachment (e.g., a harness attachment of a wearable harness being worn by an operator that is configured to receive the second end of the fall protection device to facilitate attachment of the operator relative to the fall protection device).

In various embodiments, the fall protection device connection status detection circuitry 127 may be configured to detect a first connection status defined by the first end of the fall protection device based at least in part on a determined proximity of the first end of the fall protection device relative to a workspace anchor at the first connection location. Further, the fall protection device connection status detection circuitry 127 may be configured to detect a second connection status defined by the second end of the fall protection device based at least in part on a determined proximity of the second end of the fall protection device relative to an operator attachment at the second connection location. Additionally, or alternatively, in various embodiments, the fall protection device connection status detection circuitry 127 may be configured to detect a connection condition defined by at least a portion of the fall protection device to the corresponding attachment at the respective one of the first and second connection locations based at least in part on a detected presence of the at least a portion of the fall protection device within the respective one of the first and second connection locations and the determined proximity of the at least a portion of the fall protection device relative to the corresponding attachment. For example, in various embodiments, based on at least a portion of the imaging data captured by the imaging device 110, the fall protection device connection status detection circuitry 127 may be configured to detect a first connection status associated with the first end of the fall protection device at the first connection location by detecting a first connection condition defined by a determined connection of the first end of the fall protection device to the workspace anchor at the first location connection (e.g., based at least in part on a first proximity of the first fall protection device end relative to the workspace anchor and/or a detection of the first end being present at the first connection location). As a further example, in various embodiments, based on at least a portion of the imaging data captured by the imaging device 110, the fall protection device connection status detection circuitry 127 may be configured to detect a second connection status associated with the second end of the fall protection device at the second connection location by detecting a second connection condition defined by a determined connection of the second end of the fall protection device to the operator attachment at the second connection location (e.g., based at least in part on a second proximity of the second end of the fall protection device relative to the operator attachment and/or a detection of the second end being present at the second connection location).

In various embodiments, the fall protection device connection status detection circuitry 127 may be configured to at least facilitate a detection of a safe operating condition associated with a workspace by determining that the first connection status is defined by a first connection condition defined by the first end of the fall protection device being connected to the workspace anchor at the first connection location and a second connection status is defined by a second connection condition defined by the second end of the fall protection device being connected to the operator attachment at the second connection location. In various embodiments, upon detecting that the first connection status and the second connection status associated with the fall protection device are defined by a first connection condition and a second connection condition, respectively, the fall protection device connection status detection circuitry 127 may be configured to identify the fall protection device as being installed in a fully installed configuration.

Further, in various embodiments, the fall protection device connection status detection circuitry 127 may be configured to detect a first connection status associated with the first end of the fall protection device at the first connection location by detecting a first detached condition defined by a determined separation of the first end of the fall protection device relative to the workspace anchor at the first connection location (e.g., based at least in part on a first separation distance between the first end of the fall protection device and the workspace anchor and/or a detection of the first end not being present at the first connection location). The fall protection device connection status detection circuitry 127 may be further configured to detect a second connection status associated with the second end of the fall protection device at the second connection location by detecting a second detached condition defined by a determined separation of the second end of the fall protection device relative to the operator attachment at the second connection location (e.g., based at least in part on a second separation distance between the second end of the fall protection device and the operator attachment and/or a detection of the second end not being present at the second connection location).

In various embodiments, the fall protection device connection status detection circuitry 127 may be configured to at least facilitate a detection of a danger operating condition associated with a workspace by determining that one or both of the first connection status and the second connection status is defined by a detached condition. For example, the fall protection device connection status detection circuitry 127 may be configured to at least facilitate a detection of a danger operating condition associated with a workspace by determining that the first connection status defined by a first detached condition defined by the first end of the fall protection device being disconnected from the workspace anchor at the second first connection location. Further, the fall protection device connection status detection circuitry 127 may be configured to at least facilitate a detection of the danger operating condition by determining that the second connection status is defined by a second detached condition defined by the second end of the fall protection device being disconnected from the operator attachment at the second connection location. In various embodiments, upon detecting that one of the first connection status and the second connection status associated with the fall protection device is defined by a detached condition, the fall protection device connection status detection circuitry 127 may be configured to identify the fall protection device as being installed in an at least partially uninstalled configuration.

In various embodiments, the fall protection device connection status detection circuitry 127 may be configured such that, upon detecting the first connection status and the second connection status associated with the fall protection device, the fall protection device connection status detection circuitry 127 may transmit at least one signal comprising a control signal configured to cause at least a portion of the operation functionalities of the materials handling vehicle to be suspended. For example, in such an exemplary circumstance, in various embodiments, the fall protection device connection status detection circuitry 127 may transmit at least one signal comprising a control signal configured to cause the materials handling vehicle (e.g., the drive controls, the lift controls) to be shut down, thereby preventing the materials handling vehicle from being operated while the workspace operating condition detection apparatus 100 detected a dangerous condition. In such an exemplary configuration, the workspace operating condition detection apparatus 100 may facilitate wither a primary or a secondary (e.g., redundant) "dead man button."

In various embodiments, the fall protection device connection status detection circuitry 127 may be configured such that, upon detecting the first connection status and the second connection status associated with the fall protection device, the fall protection device connection status detection circuitry 127 may transmit at least one signal and/or corresponding data (e.g., data indicative of the fall protection device being configured in a fully-installed configuration and/or in an at least partially uninstalled configuration) to one or more of the operator position status detection circuitry 128, the alert management circuitry 129, the input/output circuitry 123, and/or the imaging device data repository 107, such as, for example, in order to facilitate a determination of a workspace operating condition.

In various embodiments, the processor 122 may be configured to communicate with the operator position status detection circuitry 128. The operator position status detection circuitry 128 may be a device or circuitry embodied in either hardware or a combination of hardware and software that is configured to detect an operator position status associated with a workspace and defined by a position (e.g., presence) of an operator within the workspace and/or relative to an operating position based at least in part on imaging data captured by the imaging device 110 and/or corresponding supported data received from the image processing circuitry 126 (e.g., data associated with a detected operator presence and/or the operator position location). For example, in various embodiments, the operator position status detection circuitry 128 may be configured to detect an operator position status associated with a workspace defined by a materials handling vehicle (e.g., an operating position defined therein) based on imaging data captured by the imaging device 110, including one or more images showing an operator position location defined within the workspace. For example, in various embodiments, an operator position status may be defined according to one or more of a detected unoccupied workspace condition, a detected occupied workspace condition, and a detected out-of-position operator condition.

In various embodiments, the operator position status detection circuitry 128 may be configured to determine one or more characteristics associated with the operator, such as, for example, an operator presence characteristic, an operator orientation characteristic, and/or the like based on the imaging data captured by the imaging device 110 in order to facilitate a detection of the operator position status. For example, a detected unoccupied workspace condition at the operator position location may be defined by an operator presence characteristic (e.g., a characteristic determined by the controller 120 based on the captured imaging data from the imaging device 110) in which an operator is not present within the workspace (e.g., at the operator position location). Further, a detected occupied workspace condition at the operator position location may be defined by an operator presence characteristic (e.g., a characteristic determined by the controller 120 based on the captured imaging data from the imaging device 110) in which an operator is present within the workspace (e.g., at the operator position location). Further still, a detected out-of-position operator condition at the operator position location may be defined by an operator orientation characteristic (e.g., a characteristic determined by the controller 120 based on the captured imaging data from the imaging device 110) in which an operator is not oriented (e.g., positioned) in an operating position, such as, for example, wherein the operator is in a rear-facing orientation facing away from the vehicle operation controls of the materials handling vehicle such that the operator's back is not within a field of view of the imaging device. Alternatively, or additionally, an out-of-position operator condition may be defined by a fall protection device presence characteristic in which the operator attachment and/or the second end of the fall protection are not present (e.g., detectable by the imaging device) within the second connection location. For example, a detected out-of-position operator condition may correspond to an operator being oriented such that the operator attachment is not disposed within the field of view of the imaging device and/or such that the line of sight of the imaging device to the second connection location is obstructed.

In various embodiments, the operator position status detection circuitry 128 may be configured to detect, based on the imaging data captured by the imaging device 110, an operator position status associated with an operator and/or a workspace, wherein the operator position status is based at least in part on a detected presence of the operator (e.g., a determined operator presence characteristic) at an operator position location defined within the workspace. Further, in various embodiments, the operator position status detection circuitry 128 may be configured to detect, based on the imaging data captured by the imaging device 110, an operator position status associated with an operator and/or a workspace, wherein the operator position status is based on both a detected presence of the operator (e.g., a determined operator presence characteristic) at the operator position location and a detected orientation of the operator (e.g., a determined operator orientation characteristic) relative to the operating position. Further, in various embodiments, the operator position status detection circuitry 128 may be configured to detect, based on the imaging data captured by the imaging device 110, productivity measurement data corresponding to one or more actions and/or operations executed by an operator within the workspace defined by the materials handling vehicle. For example, in various embodiments, the operator position status detection circuitry 128 may be configured to detect productivity management data embodying a quantification and/or characterization of one or more actions, conditions, operations associated with the operator's operation of the materials handling vehicle or the execution of an action by the operator within the workspace as captured by the imaging device 110. As a non-limiting example, the operator position status detection circuitry 128 may be configured to process image data captured by the imaging device 110 to detect productivity management data such as, for example, the average amount of time required for an operator to retrieve an object from within a storage location, the average amount of times the operator moves his or her right hand during operation of the materials handling vehicle, the average number of times an operator reconfigures the vertical height of an exemplary materials handling vehicle during a single operation thereof. The controller 120 (e.g., the operator position status detection circuitry 128) may be configured to detect, determine, and/or otherwise generate productivity measurement data in order to assess various ergonomic, productivity, and/or efficiency characteristics within a particular materials handling environment.

In various embodiments, the operator position status detection circuitry 128 may be configured to at least facilitate a detection of one or more of a standby operating condition, a safe operating condition, and a danger operating condition associated with a workspace by determining that the operator position status is defined by an occupied workspace condition in which the operator is present within the workspace. Further, in various embodiments, the operator position status detection circuitry 128 may be configured to at least facilitate a detection of a disarmed operating condition associated with a workspace by determining that the operator position status is defined by an unoccupied workspace condition in which an operator is not present within the workspace. Further, in various embodiments, the operator position status detection circuitry 128 may be configured to at least facilitate a detection of a blind spot operating condition associated with a workspace by determining that the operator position status is defined by an out-of-position operator condition in which an operator is not positioned/oriented in an operating position within the workspace (e.g., such that a second end of the fall protection device and/or the operator attachment are not within the field of view of the imaging device).

In various embodiments, the operator position status detection circuitry 128 may be configured such that, upon detecting the operator position status associated with the workspace, the operator position status detection circuitry 128 may transmit at least one signal and/or corresponding data (e.g., data indicative of the operator being positioned/oriented in an operating position within the workspace) to one or more of the fall protection device connection status detection circuitry 127, the alert management circuitry 129, the input/output circuitry 123, and/or the imaging device data repository 107, such as, for example, in order to facilitate a determination of a workspace operating condition.

In various embodiments, the processor 122 may be configured to communicate with the alert management circuitry 129. The alert management circuitry 129 may be a device or circuitry embodied in either hardware or a combination of hardware and software that is configured to, upon a workspace operating condition associated with the workspace being detected by the exemplary workspace operating condition detection apparatus 100, cause one or more alert signals corresponding to the detected workspace operating condition to be transmitted from an operating condition indicator of the exemplary workspace operating condition detection apparatus 100. As described herein, the alert management circuitry 129 may facilitate transmission (e.g., emission, display, and/or any other perceivable means of signal communication) of an exemplary alert signal comprising an audio and/or visual signal corresponding to a detected workspace operating condition that, upon being transmitted from the operating condition indicator, may embody a perceivable indication of the workspace operating condition (e.g., a light, a sound, a message, and/or the like, or any combination thereof) and/or an instructional message corresponding to the detected workspace operating condition. For example, the alert management circuitry 129 may generate an indicator signal corresponding to the detected workspace operating condition and may cause the indicator signal to be transmitted to the operating condition indicator for transmission therefrom as one or more audio and/or visual alert signals embodying an indication of the workspace operating condition detected by the workspace operating condition detection apparatus 100. As described herein, the alert management circuitry 129 may be configured to facilitate transmission of a unique alert signal depending on the workspace operating condition that is detected by the workspace operating condition detection apparatus 100, such as, for example, a first alert signal having a first signal configuration that corresponds to a standby operating condition, a second alert signal having a second signal configuration that corresponds to a safe operating condition, a third alert signal having a third signal configuration that corresponds to a blind spot operating condition, and a fourth alert signal having a fourth signal configuration that corresponds to a danger operating condition, wherein each of the first, second, third, and fourth signal configurations are different from one another.

In various embodiments, an exemplary workspace operating condition detection apparatus 100 may be configured with, or in communication with, an imaging device data repository 107. The imaging device data repository 107 may be stored, at least partially on the memory 121 of the system. In some embodiments, the imaging device data repository 107 may be remote from, but in connection with, the apparatus 100. The imaging device data repository 107 may contain information, such as images relating to one or more materials handling vehicles (e.g., workspaces), human body types, fall protection devices, fastening/attachment means, and/or the like. In some embodiments, the apparatus 100 may also use machine learning for detecting one or more conditions, statuses, and/or the like associated with a fall protection device, an operator, and/or a workspace (e.g., a materials handling vehicle) in order to facilitate the detection of a workspace operating condition associated with the workspace, such that the apparatus 100 may use a reference database, such as the imaging device data repository 107, to initially train the apparatus 100 and then may be configured to detect a workspace operating condition without referencing the imaging device data repository 107 or other reference databases. For example, in various embodiments, a controller 120 may be configured to execute a feedback loop, wherein one or more imaging data and corresponding connection statuses, operator position statuses, connection conditions, detached conditions, operator position conditions (e.g., occupied workspace conditions, unoccupied workspace conditions, out-of-position operator conditions), and/or determined characteristics (e.g., characteristics associated with an operator, a fall protection device, and/or a materials handling vehicle) associated with the imaging data may define one or more inputs into a machine learning model in order to increase a rate of machine learning associated with the one or more machine learning techniques, as described herein.

Having described example systems, apparatuses, environments, data flows in accordance with the present disclosure, example processes in accordance with the present disclosure will now be discussed. It will be appreciated that each of the flowcharts depicts an example computer-implemented process that may performed by one or more of the apparatuses, systems, devices, and/or computer program products described herein, for example using one or more of the specially configured components thereof. The blocks depicted indicate operations of each process. Such operations may be in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

As described herein, in various embodiments, an exemplary workspace operating condition detection apparatus may be configured to detect a workspace operating condition at a workspace based at least in part on captured imaging data associated with one or more of a fall protection device and an operator. In particular, as described herein, an exemplary workspace operating condition detection apparatus may be configured to detect a workspace operating condition within a workspace defined by a materials handling vehicle (e.g., an order picker). For example, referring now to FIGS. 4-6, various flowcharts of exemplary methods 400, 500, and 600 for detecting a workspace operating condition at a workspace based at least in part on captured imaging data associated with one or more of a fall protection device and an operator are provided. In some embodiments, one or more operations of the illustrated exemplary methods 400, 500, and/or 600 may be executed by controlling a workspace operating condition detection apparatus in accordance with one or more example embodiments described herein. For example, various operations discussed below with respect to exemplary methods 400, 500, and/or 600 may be carried out using various components of an exemplary workspace operating condition detection apparatus, such as, for example, an exemplary workspace operating condition detection apparatus 100 as described above in reference to FIGS. 1-3. In various embodiments, an exemplary workspace operating condition detection apparatus utilized to execute one or more operations of exemplary methods 400, 500, and 600 may comprise a controller, including one or more processors, an imaging device, and an operating condition indicator.

In various embodiments, although various steps described herein with respect to exemplary methods 400, 500, and 600 may be described, illustrated, and/or otherwise disclosed for illustrative purposes as sequential steps (e.g., operations) executed in series to facilitate execution of the exemplary method, it should be understood that at least a portion of the exemplary methods 400, 500, and 600 may comprise synchronous steps that may be carried out (e.g., by an exemplary workspace operating condition detection apparatus) at least substantially simultaneously. For example, in various embodiments, a workspace operating condition may be detected at an at least substantially singular instance based on a plurality of data outputs corresponding to a plurality of workspace and/or operator configurations (e.g., positions, orientations, connections, and/or the like) as captured by an exemplary imaging device in association with at least substantially the same instance. For example, at least a portion of the exemplary methods described herein may be facilitated by a machine learning model wherein an artificial intelligence-driven device (e.g., the controller of an exemplary workspace operating condition detection apparatus) may be utilized to at least substantially minimize the number of asynchronous detection operations and/or corresponding determinations required in order for a workspace operating condition to be detected.

Figure 4:
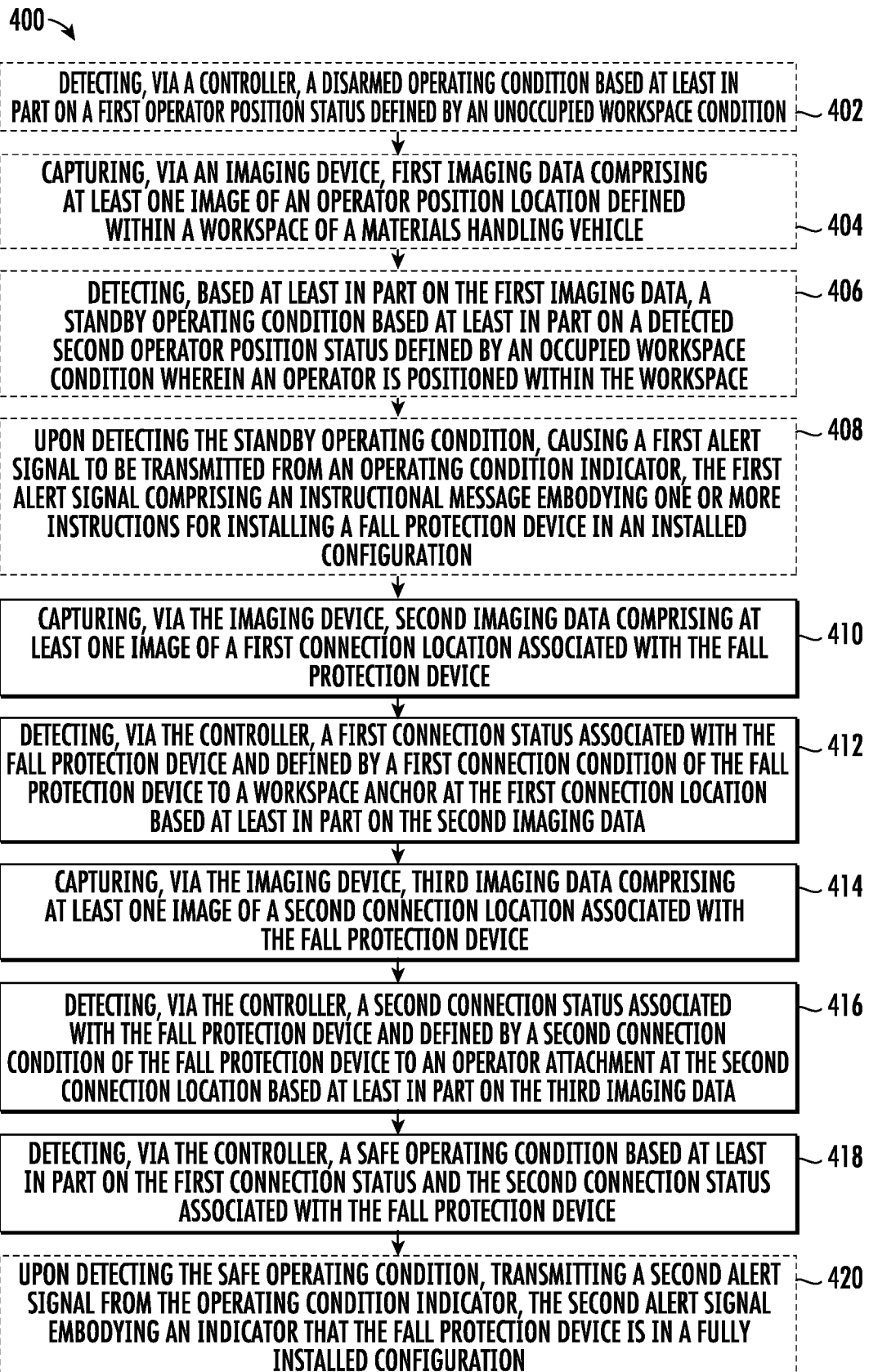
FIG. 4 is an illustrative flowchart of various steps for an example method in accordance with various embodiments of the present disclosure.

As illustrated in FIG. 4, exemplary method 400, at Block 402, may include detecting, via a controller, a disarmed operating condition based at least in part on a first operator position status defined by an unoccupied workspace condition. In various embodiments, a disarmed operating condition may be detected by an exemplary workspace operating condition detection apparatus based at least in part on a detected operator position status that is defined by an unoccupied workspace condition. For example, an exemplary workspace operating condition detection apparatus may determine, based at least in part on the imaging data captured by the imaging device, that an operator is not present within the workspace (e.g., an operator presence characteristic), and thus, may detect an unoccupied workspace condition at the workspace (e.g., at an operator position location defined within the workspace that is within the field of view of the imaging device), which defines the operator position status. In various embodiments, the disarmed operating condition detected by an exemplary workspace operating condition detection apparatus may correspond to a materials handling vehicle being inactive (e.g., not in operation) and not occupied by an operator.

At Block 404, exemplary method 400 may further include capturing, via an imaging device, first imaging data comprising at least one image of an operator position location defined within a workspace of a materials handling vehicle. For example, the first imaging data may be captured by the imaging device of an exemplary workspace operating condition detection apparatus and may comprise at least one image showing, at least, the operator position location within the workspace. As described herein, an operator position location may comprise a location within a field of view of an imaging device of an exemplary workspace operating condition detection apparatus that may be occupied by an operator (e.g., a portion of the operator's back) when the operator is present within the workspace, such as, for example, at an operating position defined therein. In various embodiments, for example, first imaging data captured by the imaging device may be used to detect a workspace operating condition at a first instance.

At Block 406, exemplary method 400 may further include detecting, based at least in part on the first imaging data, a standby operating condition based at least in part on a detected second operator position status defined by an occupied workspace condition wherein an operator is positioned within the workspace. As described herein, the imaging data captured by the imaging device may be processed by the exemplary workspace operating condition detection apparatus (e.g., a controller thereof) to detect an occupied workspace condition based on a determination that that an operator is present within the workspace. For example, one or more machine learning techniques may be executed with respect to the first imaging data (e.g., the at least one image of the first imaging data that shows the operator position location) to detect the occupied workspace condition by programmatically determining that a portion of the operator's body is present within the operator position location. In various embodiments, the second operator position status defined by the detected occupied workspace condition may be used by the exemplary workspace operating condition detection apparatus to detect the standby operating condition. In various embodiments, the standby operating condition detected by an exemplary workspace operating condition detection apparatus may correspond to an operator being present within the workspace of a materials handling vehicle while the materials handling vehicle remains inactive (e.g., the operator is not operating the materials handling vehicle).

At Block 408, exemplary method 400 may further include upon detecting the standby operating condition, causing a first alert signal to be transmitted from an operating condition indicator, the first alert signal comprising an instructional message embodying one or more instructions for installing a fall protection device in an installed configuration. As described herein, upon detecting a standby operating condition associated with a workspace, an exemplary workspace operating condition detection apparatus (e.g., a controller) may generate a first alert signal that is configured for transmission (e.g., emission, display, and/or any other perceivable means of signal communication) from an operating condition indicator of the workspace operating condition detection apparatus in order to indicate the standby operating condition and/or provide one or more instructional messages to the operator and/or one or more people near the workspace (e.g., the materials handling vehicle). In various embodiments, an exemplary alert signal may comprise an audio and/or visual signal corresponding to a detected workspace operating condition that, upon being transmitted from the operating condition indicator, may embody a perceivable indication of the workspace operating condition (e.g., a light, a sound, a message, and/or the like, or any combination thereof) and/or an instructional message corresponding to the detected workspace operating condition. For example, upon detecting a standby operating condition, an exemplary workspace operating condition detection apparatus may cause a first alert signal corresponding to the standby operating condition to be transmitted from the operating condition indicator (e.g., a speaker element thereof) as an audio signal comprising an instructional message embodying one or more instructions for installing a fall protection device in an installed configuration relative to the operator.

At Block 410, exemplary method 400 further includes capturing, via the imaging device, second imaging data comprising at least one image of a first connection location associated with the fall protection device. In various embodiments, the second imaging data may be captured by the imaging device of the exemplary workspace operating condition detection apparatus and may comprise at least one image showing, at least, a first connection location within the workspace. As described herein, a first connection location may comprise a location within a field of view of the imaging device of the exemplary workspace operating condition detection apparatus at which a workspace anchor configured to facilitate installation of a fall protection device relative to the workspace (e.g., the materials handling vehicle) may be located. For example, the workspace anchor provided at the first connection location may comprise one or more fastening means configured for coupling to a first end of the fall protection device in order to anchor the fall protection device relative to the materials handling vehicle based at least in part on a connection of the first end to the workspace anchor. In various embodiments, for example, second imaging data captured by the imaging device may be used to detect a workspace operating condition at a second instance.

At Block 412, exemplary method 400 further includes detecting, via the controller, a first connection status associated with the fall protection device and defined by a first connection condition of the fall protection device to a workspace anchor at the first connection location based at least in part on the second imaging data. As described herein, the second imaging data captured by the imaging device may be processed by the exemplary workspace operating condition detection apparatus (e.g., a controller thereof) to detect a first connection condition associated with a fall protection device, which defines the first connection status. For example, one or more machine learning techniques may be executed with respect to the second imaging data (e.g., the at least one image of the second imaging data that shows the first connection location) to detect the first connection condition by programmatically determining that the first end of the fall protection device is connected (e.g., coupled, attached, and/or otherwise secured) to the workspace anchor within the first connection location. In various embodiments, the first connection condition defined by a connection of the first end of the fall protection device to the workspace anchor may be programmatically determined based on one or both of a detected presence of the first end of the fall protection device within the first connection location and a proximity (e.g., a separation distance) of the first end of the fall protection device relative to the workspace anchor.

At Block 414, exemplary method 400 further includes capturing, via the imaging device, third imaging data comprising at least one image of a second connection location associated with the fall protection device. In various embodiments, the third imaging data may be captured by the imaging device of the exemplary workspace operating condition detection apparatus and may comprise at least one image showing, at least, a second connection location within the workspace. As described herein, a second connection location may comprise a location within the field of view of the imaging device of the exemplary workspace operating condition detection apparatus at which an operator attachment of a wearable harness being worn by an operator may be located (e.g., when the operator is positioned in the operating position). For example, the operator attachment provided at the second connection location may embody a component of a wearable harness comprising one or more fastening means configured for coupling to a second end of a fall protection device in order to facilitate installation of a fall protection device relative to the operator based at least in part on a connection of the second end to the operator attachment. In various embodiments, for example, third imaging data captured by the imaging device may be used to detect a workspace operating condition at a third instance. In various embodiments, the third instance may be at least substantially the same as the second instance described above, such that the third imaging data and the second imaging data may be used by an exemplary workspace operating condition detection apparatus to detect a workspace operating condition that may be defined by a plurality conditions associated with a respective plurality of locations (e.g., an operator position location, a first connection location, a second location) defined within the workspace.

At Block 416, exemplary method 400 further includes detecting, via the controller, a second connection status associated with the fall protection device and defined by a second connection of the fall protection device to an operator attachment at the second connection location based at least in part on the third imaging data. As described herein, the third imaging data captured by the imaging device may be processed by the exemplary workspace operating condition detection apparatus (e.g., a controller thereof) to detect a second connection condition associated with a fall protection device, which defines the second connection status. For example, one or more machine learning techniques may be executed with respect to the third imaging data (e.g., the at least one image of the third imaging data that shows the second connection location) to detect the second connection condition by programmatically determining that the second end of the fall protection device is connected (e.g., coupled, attached, and/or otherwise secured) to the operator attachment within the second connection location. In various embodiments, the second connection condition defined by a connection of the second end of the fall protection device to the operator attachment of a harness being worn by an operator may be programmatically determined based on one or both of a detected presence of the second end of the fall protection device within the second connection location and a proximity (e.g., a separation distance) of the second end of the fall protection device relative to the operator attachment.

At Block 418, exemplary method 400 further includes detecting, via the controller, a safe operating condition based at least in part on the first connection status and the second connection status associated with the fall protection device. For example, an exemplary workspace operating condition detection apparatus may detect the safe operating condition upon detecting a first connection status defined by the first connection condition detected at the first connection location and a second connection status defined by the second connection condition detected at the second connection location. As described herein, the safe operating condition may correspond to the fall protection apparatus being installed in a fully installed configuration. Further, in various embodiments, a detection of a safe operating condition may be further based on a detected operator position status being defined by an occupied workspace condition. For example, in such an exemplary circumstance, a detected safe operating condition may correspond to an operator being present within the workspace of a materials handling vehicle while the fall protection apparatus is installed in a fully installed configuration.

At Block 420, exemplary method 400 may further include upon detecting the safe operating condition, transmitting a second alert signal from the operating condition indicator, the second alert signal embodying an indicator that the fall protection device is in a fully installed configuration. As described herein, upon detecting a safe operating condition associated with a workspace, an exemplary workspace operating condition detection apparatus may generate a second alert signal that is configured to be transmitted from an operating condition indicator of the workspace operating condition detection apparatus as an indication of the safe operating condition to the operator and/or one or more people near the workspace (e.g., the materials handling vehicle). For example, upon detecting a safe operating condition, an exemplary workspace operating condition detection apparatus may cause a second alert signal corresponding to the safe operating condition to be transmitted from the operating condition indicator as a visual signal, such as, for example, a selective lighting of a light element (e.g., an LED) of the operating condition indicator that is configured to emit light of a particular color corresponding specifically to the safe operating condition (e.g., a green light).

Figure 5:
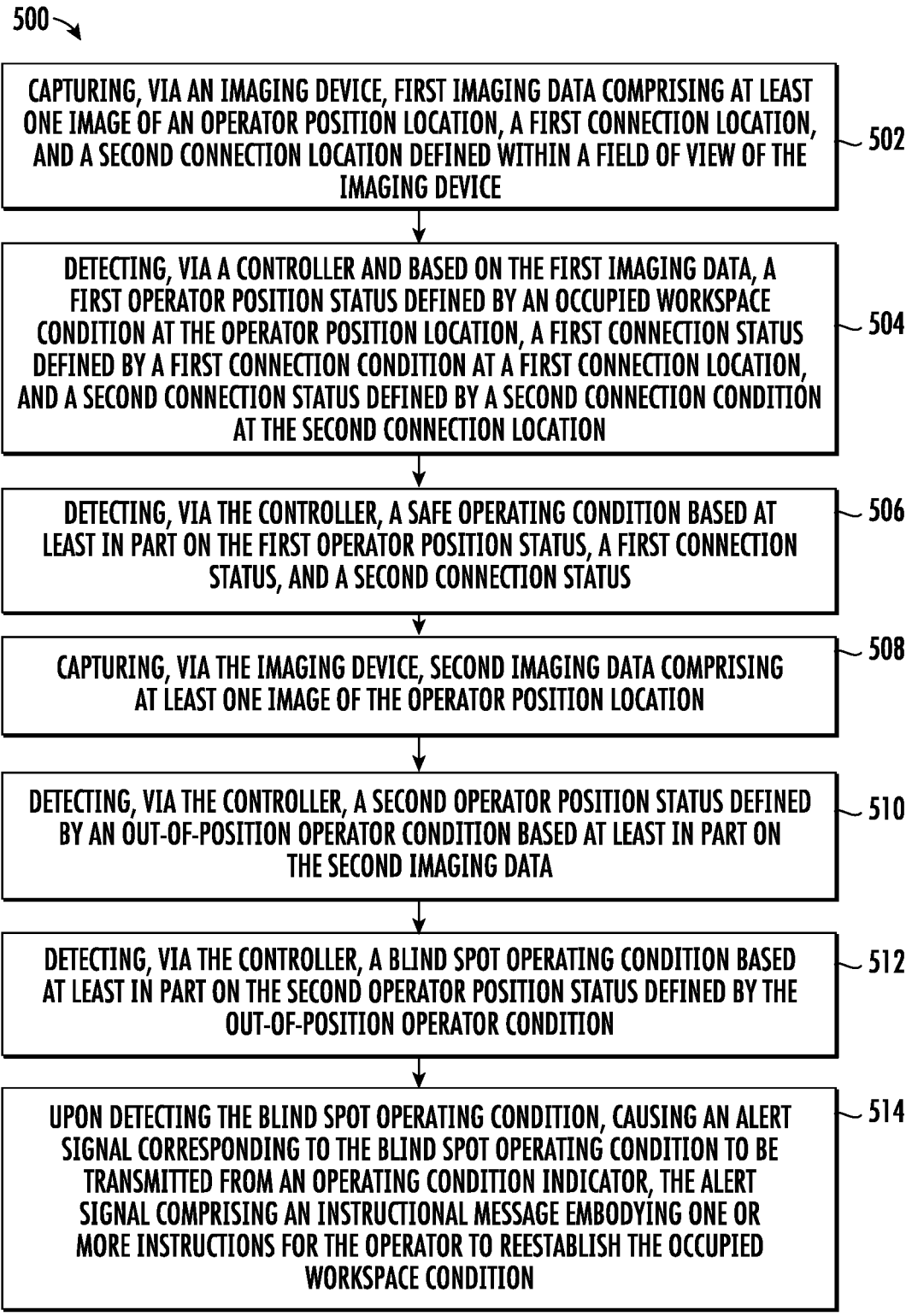
FIG. 5 is an illustrative flowchart of various steps for an example method in accordance with various embodiments of the present disclosure.

FIG. 5 illustrates an exemplary method 500 of detecting a workspace operating condition at a workspace based at least in part on captured imaging data associated with one or more of a fall protection device and an operator are provided. As illustrated in FIG. 5, exemplary method 500, at Block 502, may include capturing, via an imaging device, first imaging data comprising at least one image of an operator position location, a first connection location, and a second connection location defined within a field of view of the imaging device. As described herein, the first connection location and the second connection location are associated with a fall protection device and the operating position location is defined within a workspace of a materials handling vehicle.

At Block 504, exemplary method 500 may further include detecting, via a controller and based at least in part on the first imaging data, a first operator position status defined by an occupied workspace condition at the operator position location, a first connection status defined by a first connection condition at the first connection location, and a second connection status defined by a second connection condition at the second connection location. For example, in various embodiments, an occupied workspace condition may be defined at least in part by an operator being in an operating position within the workspace. Further, as described herein, the first connection condition may be defined by a detected connection (e.g., a proximity, a presence, and/or the like, or any combination thereof) of a first end of the fall protection device to a workspace anchor at the first connection location, and the second connection condition may be defined by a detected connection of second first end of the fall protection device to an operator attachment at the second connection location, such that the first connection condition and the second connection condition being detected may correspond to a detection that the fall protection device is arranged in a fully installed configuration.

At Block 506, exemplary method 500 may further include detecting, via the controller, a safe operating condition based at least in part on the first operator position status, the first connection status, and the second connection status. In various embodiments, a safe operating condition being detected by an exemplary workspace operating condition detection apparatus may correspond to an operator being present at an operating position within a workspace and the fall protection device being installed in a fully installed configuration (e.g., being anchored at a workspace anchor of a materials handling vehicle and connected to an operator attachment of a wearable harness being worn by the operator positioned within the workspace).

At Block 508, exemplary method 500 may further include capturing, via the imaging device, second imaging data comprising at least one image of the operator position location. In various embodiments, for example, second imaging data captured by the imaging device may be used to detect a workspace operating condition at a second instance.

At Block 510, exemplary method 500 may further include detecting, via the controller, a second operator position status defined by an out-of-position operator condition based at least in part on the second imaging data. In various embodiments, an out-of-position operator condition may be defined by a determination that an operator is present within a workspace (e.g., at the operator position location), but that the operator is not positioned in an operating position, such as, for example, wherein an operator orientation is a rearward-facing orientation facing away from the vehicle operation controls of the materials handling vehicle. Alternatively, or additionally, an out-of-position operator condition may be defined by a determination that an operator attachment and/or the second end of the fall protection are not present within the second connection location. For example, in such an exemplary circumstance, operator attachment of the wearable harness being worn by the operator may not be within the field of view of the imaging device (e.g., at the second connection location) such that the one or more images defined by the second imaging data do not show the operator attachment and the second connection status associated with the fall protection device may not be confirmed using the second imaging data. As described herein, the second imaging data captured by the imaging device may be processed by the exemplary workspace operating condition detection apparatus (e.g., using one or more machine learning techniques) to detect an out-of-position operator condition based on a determination that, at least substantially immediately following the detection of a safe operating condition associated with the workspace, the presence of the second end of the fall protection device cannot be detected within the second connection location, despite an operator being present within the workspace (e.g., at the operating position location) and the first end of the fall protection device is connected to the workspace anchor (e.g., at the first connection location).

At Block 512, exemplary method 500 may further include detecting, via the controller, a blind spot operating condition based at least in part on the second operator position status defined by the out-of-position operator condition. In various embodiments, an exemplary workspace operating condition detection apparatus may detect the blind spot operating condition upon detecting the second operator position status defined by the out-of-position operator condition. Alternatively, or additionally, an exemplary workspace operating condition detection apparatus may detect the blind spot operating condition upon detecting a first connection status defined by the first connection condition detected at the first connection location and a second connection status defined by an absent condition detected at the second connection location wherein the operator attachment and/or the second end of the fall protection device are not detectable to the workspace operating condition detection apparatus at the second connection location. For example, a blind spot operating condition detected by an exemplary workspace operating condition detection apparatus may correspond to the operator being positioned and/or oriented within the workspace such that one or both of the operator attachment and the second end of the fall protection device are arranged in a blind spot relative to the imaging device.

At Block 514, exemplary method 500 may further include, upon detecting the blind spot operating condition, causing an alert signal corresponding to the blind spot operating condition to be transmitted from an operating condition indicator, the alert signal comprising an instructional message embodying one or more instructions for the operator to reestablish the safe operating condition. In various embodiments, a controller may generate one or more indicator signals based on the detected blind spot operating condition and transmit the indicator signal(s) to the operating condition indicator for transmission therefrom. For example, in various embodiments, an alert signal corresponding to a detected blind spot operating condition may comprise an audio signal and/or a visual signal embodying an instructional message that includes one or more instructions for the operator to reestablish an occupied workspace condition at the operator position location and/or reestablish a second connection condition at the second connection location by returning to an operating position within the workspace. Further, in various embodiments, the alert signal corresponding to the blind spot operating condition may comprise a visual signal, such as, for example, a selective lighting of a light element (e.g., an LED) of the operating condition indicator that is configured to emit light of a particular color corresponding specifically to the blind spot operating condition (e.g., an orange light). In various embodiments, the alert signal corresponding to the blind spot operating condition may be generated for transmission from the operating condition indicator after the passing of a predetermined amount of time subsequent to the detection of the blind spot operating condition. For example, upon the blind spot operating condition being detected, the generation of a corresponding alert signal configured to be transmitted from the operating condition indicator may be delayed by a predetermined amount of time, such as, for example, five seconds, ten seconds, and/or the like, to provide a temporary grace period within which an operator may reestablish the previous safe operating condition prior to the alert signal corresponding to the blind spot operating condition being transmitted from the operating condition indicator. For example, such an exemplary configuration may minimize the number of unnecessary and/or inaccurate alert signals transmitted based on a detected workspace operating condition that is caused by an inadvertent and/or momentary reconfiguration within the workspace.

In an exemplary circumstance wherein the operator moves such that the operator position status is switched from the previously detected out-of-position operator condition back to an occupied workspace condition, and/or where the operator attachment and the second end of the fall protection device are detectable as being present at the second connection location based on imaging data captured by the imaging device, the exemplary workspace operating condition detection apparatus may reestablish a safe operating condition. Alternatively, or additionally, in various embodiments wherein a safe operating condition is not reestablished, as described above, within a predetermined amount of time, such as, for example, within five seconds after the detection of the blind spot operating condition, a danger operating condition may be detected and a corresponding second alert signal including one or more audio and/or visual warning messages may be transmitted from the operating condition indicator.

Figure 6:
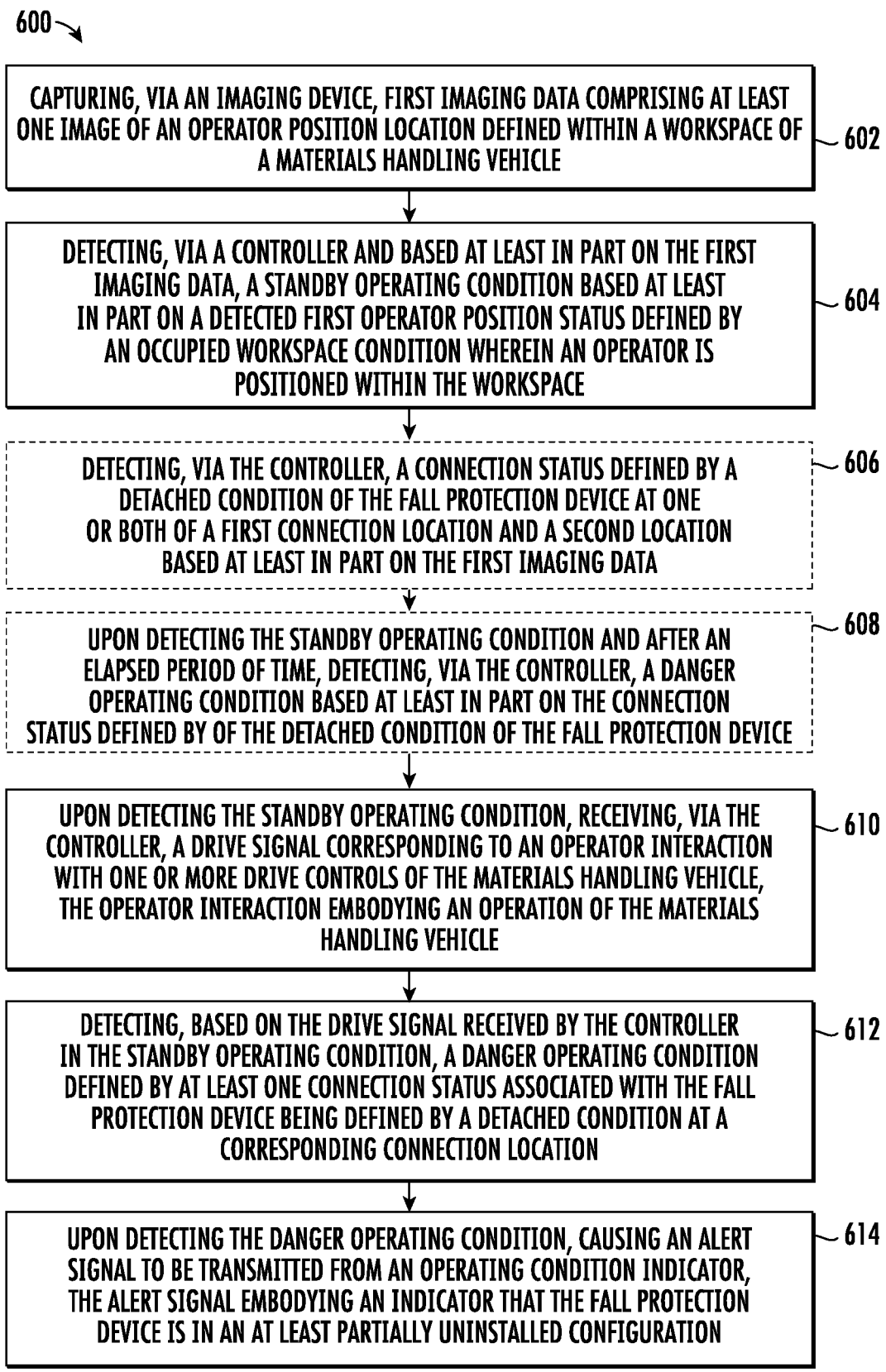
FIG. 6 is an illustrative flowchart of various steps for an example method in accordance with various embodiments of the present disclosure.

FIG. 6 illustrates an exemplary method 600 of detecting a workspace operating condition at a workspace based at least in part on captured imaging data associated with one or more of a fall protection device and an operator are provided. As illustrated in FIG. 6, exemplary method 600, at Block 602, may include capturing, via an imaging device, first imaging data comprising at least one image of an operator position location defined within a workspace of a materials handling vehicle At Block 604, exemplary method 600 may further include detecting, via a controller and based at least in part on the first imaging data, a standby operating condition based at least in part on a detected first operator position status defined by an occupied workspace condition wherein an operator is positioned within the workspace.

At Block 606, exemplary method 600 may further include detecting, via the controller, a connection status defined by a detached condition of the fall protection device at one or both of a first connection location and a second location based at least in part on the first imaging data. In various embodiments, a detached condition detected at a first connection location, as described herein, may be defined by a detection that a first end of the fall protection device is not connected to a workspace anchor. Further, a detached condition detected at a second connection location, as described herein, may be defined by a detection that a second end of the fall protection device is not connected to an operator attachment (e.g., a harness attachment secured to a harness being worn by the operator). As an illustrative example, in various embodiments, a detection that the first end of the fall protection device is not connected to the workspace anchor may be based at least in part on a determined proximity (e.g., arrangement) of the first end of the fall protection device relative to the workspace anchor being defined by a distance that is at least substantially larger than a predetermined distance value that an exemplary workspace operating condition detection apparatus has associated with a connection condition (e.g., based on one or more machine learning techniques). Alternatively, or additionally, in various embodiments, a detection that the first end of the fall protection device is not connected to the workspace anchor may be based at least in part on a determination, based on the imaging data captured by the imaging device, that the first end of the fall protection device is not present at the first connection location. In various embodiments, a detection of a first connection status at the first connection location or and/or a second connection status at the second connection location being defined by a detached condition may be indicative that the fall protection device is installed in an at least partially uninstalled configuration and, further, may correspond to a detection of a danger operating condition, as described herein.

At Block 608, exemplary method 600 may further include, upon detecting the standby operating condition and after an elapsed period of time, detecting, via the controller, a danger operating condition based at least in part on the connection status defined by of the detached condition of the fall protection device. In various embodiments, a danger operating condition may be detected based at least in part on a determination that a predetermined amount of time has elapsed since the detection of the standby operating condition without a safe operating condition being detected. As an illustrative example, in an exemplary circumstance wherein a first connection condition and a second connection condition associated with the fall protection device are not detected at a first connection location and a second connection condition, respectively, within a predetermined amount of time after the standby operating condition is detected, such as, for example, ten seconds, 20 seconds, and/or the like, a danger operating condition may be detected by an exemplary workspace operating condition detection apparatus.

At Block 610, exemplary method 600 may further include, upon detecting the standby operating condition, receiving, via the controller, a drive signal corresponding to an operator interaction with one or more drive controls of the materials handling vehicle, the operator interaction embodying an operation of the materials handling vehicle. In various embodiments, an operator at an operating position within the workspace of a materials handing vehicle may interact with the drive controls of the materials handling vehicle in order to drive, control, and/or otherwise operate the materials handling vehicle. For example, the controller of an exemplary workspace operating condition detection apparatus may receive a corresponding drive signal as an indication that the materials handling vehicle is being operated at a particular instance.

At Block 612, exemplary method 600 may further include detecting, based on the drive signal received by the controller in the standby operating condition, a danger operating condition defined by at least one connection status associated with the fall protection device being defined by a detached condition at a corresponding connection location. In various embodiments, an exemplary workspace operating condition detection apparatus may detect a danger operating condition in an exemplary circumstance wherein a standby operating condition is detected and a drive signal is received by the workspace operating condition detection apparatus prior to a safe operating condition being detected. For example, a danger operating condition may be detected wherein, upon receiving a drive signal, the exemplary workspace operating condition detection apparatus detects either a first connection status defined by a first detached condition detected at the first connection location or a second connection status defined by a second detached condition detected at the second connection location Further, in various embodiments, an exemplary workspace operating condition detection apparatus may detect, using imaging data captured by the imaging device, a danger operating condition based at least in part on a first detection of an operator position status that is defined by an occupied workspace location at an operator position location and a second detection of either a first connection status defined by a first detached condition detected at the first connection location or a second connection status defined by a second detached condition detected at the second connection location. As described herein, the danger operating condition may correspond to the fall protection apparatus being installed in an at least partially uninstalled configuration. For example, a detected danger operating condition may correspond to an operator being present within the workspace of a materials handling vehicle while the fall protection apparatus is not installed in a fully installed configuration. Further, a detected danger operating condition may correspond to an operator being present within the workspace of a materials handling vehicle operating the materials handling vehicle (e.g., the lift assembly and/or the drive assembly thereof) with the fall protection apparatus being in an at least partially uninstalled configuration.

At Block 614, exemplary method 600 may further include, upon detecting the danger operating condition, causing an alert signal to be transmitted from an operating condition indicator, the alert signal embodying an indicator that the fall protection device is in an at least partially uninstalled configuration. In various embodiments, a controller may generate one or more indicator signals based on the detected danger operating condition and transmit the indicator signal(s) to the operating condition indicator for transmission therefrom. For example, in various embodiments, an alert signal corresponding to a detected danger operating condition may comprise an audio signal and/or a visual signal embodying an instructional message that includes one or more instructions for an operator to establish a safe operating condition, such as, for example, an instruction for the operator to stop operation of the materials handling vehicle, an instruction for the operator to install the fall protection device in a fully installed configuration, and/or the like. Further, in various embodiments, the alert signal corresponding to the danger operating condition may comprise an audio signal, such as, a siren, a buzzer, a horn, and/or the like, and/or visual signal, such as, for example, a selective lighting of a light element (e.g., an LED) of the operating condition indicator that is configured to emit light of a particular color corresponding specifically to the danger operating condition (e.g., a red light). In various embodiments, an alert signal corresponding to a danger operating condition may include one or more audio and/or visual warning messages that may be configured for transmission from the operating condition indicator as a warning to one or more persons near the materials handling vehicle.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for detecting a workspace operating condition associated with a workspace, the apparatus comprising:
    an imaging device configured to capture imaging data associated with a workspace, the imaging data comprising at least one image of a first connection location corresponding to a workspace anchor and a second connection location corresponding to an operator attachment; and
    a controller configured to detect a workspace operating condition associated with the workspace based at least in part on the imaging data captured by the imaging device;
    wherein the workspace operating condition is defined at least in part by a first connection status of a fall protection device at the first connection location and a second connection status of the fall protection device at the second connection location, wherein the controller configured to detect the first connection status and the second connection status based at least in part on the imaging data;
    wherein the workspace operating condition comprises a safe operating condition, and wherein detecting the safe operating condition comprises:
    detecting the safe operating condition based at least in part on the first connection status being defined by a first connection condition between the fall protection device and the workspace anchor and the second connection status being defined by a second connection condition between the fall protection device and the operator attachment; and
    detecting the first connection condition based on one or more of a determined proximity of a first end of the fall protection device to the workspace anchor, the determined interconnection orientation between the first end of the fall protection device and the workspace anchor, and a detected presence of the first end of the fall protection device at the first connection location.

2. The apparatus of claim 1, wherein the workspace is defined by a materials handling vehicle, wherein the imaging device is secured to the materials handling vehicle and configured relative to the workspace such that the first connection location and the second connection location are within a field of view of the imaging device.

3. The apparatus of claim 1, wherein the imaging data comprises at least one image of a operator position location corresponding to an operating position defined within the workspace; wherein the controller is further configured to detect an operator position status at the operator position location based at least in part on the imaging data; and wherein the controller is configured to detect the safe operating condition based further on the operator position status being defined by an occupied workspace condition.

4. The apparatus of claim 1, wherein the controller is further configured to monitor the workspace operating condition associated with the workspace by at least substantially continuously capturing the imaging data.

5. The apparatus of claim 1, wherein the imaging data further comprises at least one image of an operator position location corresponding to an operating position defined within the workspace, and wherein the controller is further configured to detect an operator position status at the operator position location based at least in part on the imaging data.

6. The apparatus of claim 5, wherein the workspace operating condition comprises a blind spot operating condition, and wherein the controller is configured to detect the blind spot operating condition based at least in part on the first connection status being defined by a first connection condition between the fall protection device and the workspace anchor and one or more of the operator position status being defined by an out-of-position operator condition and the second connection status being defined by an absent condition wherein the operator attachment is not present within a field of view of the imaging device.

7. The apparatus of claim 5, wherein the workspace operating condition comprises a danger operating condition, and wherein the controller is configured to detect the danger operating condition based at least in part on the operator position status being defined by an occupied workspace condition, and one or more of the first connection status and the second connection status being defined by a detached condition of the fall protection device.

8. The apparatus of claim 7, wherein the controller is further configured to detect a drive signal corresponding to an operator interaction with one or more controls of a materials handling vehicle comprising the workspace, and wherein the controller is configured to detect the danger operating condition based further on a detection of the drive signal at an instance when the one or more of the first connection status and the second connection status is defined by the detached condition.

9. The apparatus of claim 1, further comprising an operating condition indicator in electronic communication with the controller such that the operating condition indicator is configured to receive one or more indicator signals corresponding to the detected workspace operating condition from the controller and, in response, transmit an alert signal corresponding to the detected workspace operating condition based on the one or more indicator signals, the alert signal embodying an indicator of the detected workspace operating condition.

10. The apparatus of claim 9, wherein the operating condition indicator is configured to transmit a first alert signal corresponding to a first detected workspace operating condition based on a first indicator signal received from the controller and a second alert signal corresponding to a second detected workspace operating condition based on a second indicator signal received from the controller, wherein the first alert signal and the second alert signal are at least substantially different from one another.

11. The apparatus of claim 1, wherein the controller is configured to process the imaging data captured by the imaging device by executing one or more machine learning operations to programmatically detect a first connection condition between the fall protection device and the workspace anchor at the first location and a second connection condition between the fall protection device and the operator attachment at the second connection location, wherein the first connection status is defined by the first connection condition and the second connection status is defined by the second connection condition.

12. The apparatus of claim 1, wherein the controller is configured to detect the first connection condition based on one or both of a determined proximity of the first end of the fall protection device to the workspace anchor and a detected presence of the first end of the fall protection device at the first connection location.

13. A method of detecting a workspace operating condition associated with a workspace, the method comprising:
capturing, via an imaging device, imaging data associated with a workspace defined by a materials handling vehicle, the imaging data comprising at least one image of a first connection location corresponding to a workspace anchor and a second connection location corresponding to an operator attachment;
detecting a workspace operating condition associated with the workspace based at least in part on the imaging data captured by the imaging device;
wherein the workspace operating condition is defined at least in part by a first connection status of a fall protection device at the first connection location and a second connection status of the fall protection device at the second connection location;
wherein the workspace operating condition comprises a safe operating condition, and wherein detecting the safe operating condition comprises:
detecting the safe operating condition based at least in part on the first connection status being defined by a first connection condition between the fall protection device and the workspace anchor and the second connection status being defined by a second connection condition between the fall protection device and the operator attachment; and
detecting the first connection condition based on one or more of a determined proximity of a first end of the fall protection device to the workspace anchor, the determined interconnection orientation between the first end of the fall protection device and the workspace anchor, and a detected presence of the first end of the fall protection device at the first connection location.

14. The method of claim 13, wherein the imaging data further comprises at least one image of an operator position location corresponding to an operating position defined within the workspace, and wherein detecting the workspace operating condition comprises detecting an operator position status at the operator position location, the first connection status, and the second connection status based at least in part on the imaging data.

15. The method of claim 13, further comprising, upon detecting the workspace operating condition, causing an alert signal corresponding to the detected workspace operating condition to be transmitted from an operating condition indicator, the alert signal embodying an indicator of the detected workspace operating condition.

16. The method of claim 13, wherein detecting the workspace operating condition comprises processing the imaging data captured by the imaging device by executing one or more machine learning operations to programmatically detect a first connection condition between the fall protection device and the workspace anchor at the first connection location and a second connection condition between the fall protection device and the operator attachment at the second connection location, wherein the first connection status is defined by the first connection condition and the second connection status is defined by the second connection condition.

17. The method of claim 13, wherein the workspace operating condition comprises a danger operating condition, and wherein detecting the danger operating condition comprises detecting, based on the imaging data, that at least one of the first connection status and the second connection status is defined by a detached condition, wherein the danger operating condition corresponds to the fall protection device being provided in an at least partially uninstalled configuration.

* * * * *